US012719872B2

(12) United States Patent
Chintan Shah et al.

(10) Patent No.: US 12,719,872 B2
(45) Date of Patent: Aug. 25, 2026

(54) SYSTEM AND METHOD FOR ESTABLISHING A TOPOLOGY FOR ADVERTISING SUPPLICANTS IN A NETWORK

(71) Applicant: RAKUTEN SYMPHONY, INC., Tokyo (JP)

(72) Inventors: Paromita Chintan Shah, Bangalore (IN); Nagendra Shridhar Bykampadi, Bangalore (IN); Krishna Pramod Adharapurapu, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 388 days.

(21) Appl. No.: 18/273,386

(22) PCT Filed: Jun. 27, 2023

(86) PCT No.: PCT/US2023/026303

§ 371 (c)(1),
(2) Date: Jul. 20, 2023

(87) PCT Pub. No.: WO2025/005905

PCT Pub. Date: Jan. 2, 2025

(65) Prior Publication Data

US 2025/0097229 A1 Mar. 20, 2025

(51) Int. Cl.
*H04L 9/40* (2022.01)

(52) U.S. Cl.
CPC ............ *H04L 63/101* (2013.01); *H04L 63/08* (2013.01); *H04L 63/166* (2013.01)

(58) Field of Classification Search
CPC ....... H04L 9/0891; H04L 41/12; H04L 63/08; H04L 9/0894; H04L 63/166; H04L 63/101; H04L 41/046
See application file for complete search history.

(56) References Cited

U.S. PATENT DOCUMENTS 8,443,187 B1 5/2013 Orr
10,721,230 B2 * 7/2020 Wei ......................... H04W 4/10
(Continued)

FOREIGN PATENT DOCUMENTS

EP 3 448 075 A1 2/2019
WO 2019/038038 A1 2/2019

OTHER PUBLICATIONS

Siwar Ben Hadj Said, "Contextual Connectivity in Multi-Access Architectures", HAL open science, 2015 (204 pages total), Accessed via the Internet: https://hal.science/tel-01206251/document.
(Continued)

*Primary Examiner* — Benjamin A Kaplan
(74) *Attorney, Agent, or Firm* — Sughrue Mion, PLLC

(57) ABSTRACT

Provided are system and method for establishing a topology for advertising supplicants a network. According to embodiments, the system may include: a memory storage storing computer-executable instructions; and at least one processor communicatively coupled to the memory storage, wherein the at least one processor may be configured to execute the instructions to: create a first authentication list for a first network entity, wherein the first authentication list specify one or more network entities that are authenticated with the first network entity; and advertise the first authentication list to a second agent deployed in a second network entity, wherein the second network entity is authenticated with the first network entity.

20 Claims, 20 Drawing Sheets

(56) References Cited

U.S. PATENT DOCUMENTS

| | | | | |
|---|---|---|---|---|
| 11,659,388 | B2 * | 5/2023 | Dashputra ............. | H04W 12/06 455/411 |
| 2009/0064293 | A1 | 3/2009 | Li et al. | |
| 2022/0345896 | A1 | 10/2022 | Ahmed et al. | |
| 2023/0021194 | A1 | 1/2023 | Grayson et al. | |
| 2023/0137465 | A1 | 5/2023 | Lo et al. | |
| 2024/0214807 | A1 | 6/2024 | Rivera et al. | |

OTHER PUBLICATIONS

Rakuten Symphony, "The Definitive Guide To Open RAN Security", Oct. 2022, pp. 1-28 (28 pages total), Accessed via the Internet: https://assets.websitefiles.com/6317e170a9eabbe0fbbf4519/63582c8cec69a24b2bcde588_221025-Security-Handbook.pdf?_fsi=0bdMIK2o.

J. Preub Mattsson, et al. "EAP-TLS 1.3: Using the Extensible Authentication Protocol with TLS 1.3", Feb. 2022, pp. 1-31 (31 pages).

N Williams Sun, "On the Use of Channel Bindings to Secure Channels", Network Working Group, 2007 (23 pages).

* cited by examiner

200

600M

| Entity M | | | |
|---|---|---|---|
| Authenticated Port | Role | Source MAC | Destination MAC |
| AuP1 | Authenticator | M1 | M12 |
| AuP3 | Authenticator | M3 | M5 |
| SuP2 | Supplicant | M2 | M6 |

600N

| Entity N | | | |
|---|---|---|---|
| Authenticated Port | Role | Source MAC | Destination MAC |
| AuP6 | Authenticator | M6 | M2 |
| SuP7 | Supplicant | M7 | M8 |

600A

| Entity A | | | |
|---|---|---|---|
| Authenticated Port | Role | Source MAC | Destination MAC |
| AuP4 | Authenticator | M4 | M11 |
| SuP5 | Supplicant | M5 | M3 |

600O

| Entity O | | | |
|---|---|---|---|
| Authenticated Port | Role | Source MAC | Destination MAC |
| AuP8 | Authenticator | M8 | M7 |
| AuP9 | Authenticator | M9 | M10 |

FIG. 6

SYSTEM AND METHOD FOR ESTABLISHING A TOPOLOGY FOR ADVERTISING SUPPLICANTS IN A NETWORK

CROSS REFERENCE TO RELATED APPLICATIONS

This application is a National Stage of International Application No. PCT/US2023/026303 filed Jun. 27, 2023.

TECHNICAL FIELD

Systems, methods, and computer programs consistent with example embodiments of the present disclosure relate to a telecommunication network, and more specifically, relate to advertising authenticated network entities for enabling network entities to view authenticated supplicants in a telecommunication network.

BACKGROUND

A radio access network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor specific.

Open RAN (O-RAN) technology has emerged to enable multiple vendors to provide hardware and/or software to a telecommunications system. Since different vendors are involved, the type of hardware and/or software provided may also be different. That is, different types of NEs may be provided by different vendors, and depending on the specific service, the NE could be virtualized in software form (e.g., virtual machine (VM)-based), or could be in physical hardware form (e.g., non-VM based).

In an open front haul network of a telecommunications system employing the O-RAN architecture, network entities may employ a port-based network access control IEEE 802.1x in order to regulate access to the network, as well as guard against transmission and reception by unidentified or unauthorized parties, and consequent network disruption, theft of service, or data loss. Network entities may refer to entities such as RAN elements (e.g., O-RAN Centralized Unit (O-CU), O-RAN Distributed Unit (O-DU), O-RAN Radio Unit (O-RU), etc) and Transport Network elements, and may have a role of either an authenticator or a supplicant. Under IEEE 802.1x, data traffic is allowed to pass between network entities only if said network entities are authenticated with each other.

In the related art, information regarding authenticated network entities (e.g., which network entities are authenticated and trustworthy) is kept locally within the corresponding network entities involved in such authentication, and such information is not shared with network entities that are not involved in such authentication. Further, in the related art, network entities may be assumed to be trustworthy if such network entities are connected to an authenticated network entity.

Accordingly, the above approach for authentication of network entity in the related art may have at least the following shortcomings. Since the information regarding authenticated network entities is kept locally and network entities may simply be assumed to be trustworthy by being connected to an authenticated network entity, such process is against the Zero Trust Model of the O-RAN architecture and there is no mechanism for a single network entity in the open front haul network to have a comprehensive view of all the authenticated network entities within the network.

Further, there is no clearly defined technique of advertising information regarding authenticated network entities in either a peer-to-peer or hub-and-spoke configuration in order to enable network entities to view authenticated supplicants in a telecommunication network. There is also no clearly defined implementation of a centralized service in the hub-and-spoke configuration, nor technique for regularly updating network elements to adapt to changes in the network.

SUMMARY

Example embodiments of the present disclosure advertises authenticated network entities for enabling network entities to view authenticated supplicants in a telecommunication network. As such, example embodiments of the present disclosure enable the development of a data store of information on authenticated supplicants for the network elements, thus building a comprehensive view of all the authenticated supplicants and defining an explicit level of trust. Further, in a hub-and-spoke configuration, the hub will store a repository of information for all the authenticated supplicants in the open front haul network; where a network mapping application may be developed on the hub to build a comprehensive topological overview of all the trusted authenticated supplicant nodes based on the data sent by each agent.

According to embodiments, a system is provided. The system may include: a memory storage storing computer-executable instructions; and at least one processor communicatively coupled to the memory storage, wherein the at least one processor may be configured to execute the instructions to: create a first authentication list for a first network entity, wherein the first authentication list specify one or more network entities that are authenticated with the first network entity; and advertise the first authentication list to a second agent deployed in a second network entity, wherein the second network entity is authenticated with the first network entity.

According to embodiments, a system is provided. The system may include: a memory storage storing computer-executable instructions; and at least one processor communicatively coupled to the memory storage, wherein the at least one processor may be configured to execute the instructions to: receive a first authentication list from a first agent deployed in a first network entity, wherein the first authentication list specify one or more network entities that are authenticated with the first network entity; and advertise the first authentication list to a second agent deployed in a second network entity, wherein the second network entity is authenticated with the first network entity.

According to embodiments, a method is provided. The method may include: creating a first authentication list for a first network entity, wherein the first authentication list specify one or more network entities that are authenticated with the first network entity; and advertising the first authentication list to a second agent deployed in a second network entity, wherein the second network entity is authenticated with the first network entity.

According to embodiments, a method is provided. The method may include: receiving a first authentication list from a first agent deployed in a first network entity, wherein the first authentication list specify one or more network entities that are authenticated with the first network entity;

and advertising the first authentication list to a second agent deployed in a second network entity, wherein the second network entity is authenticated with the first network entity.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 6 illustrates examples of authentication lists, according to one or more embodiments.

DETAILED DESCRIPTION

Figure 1:
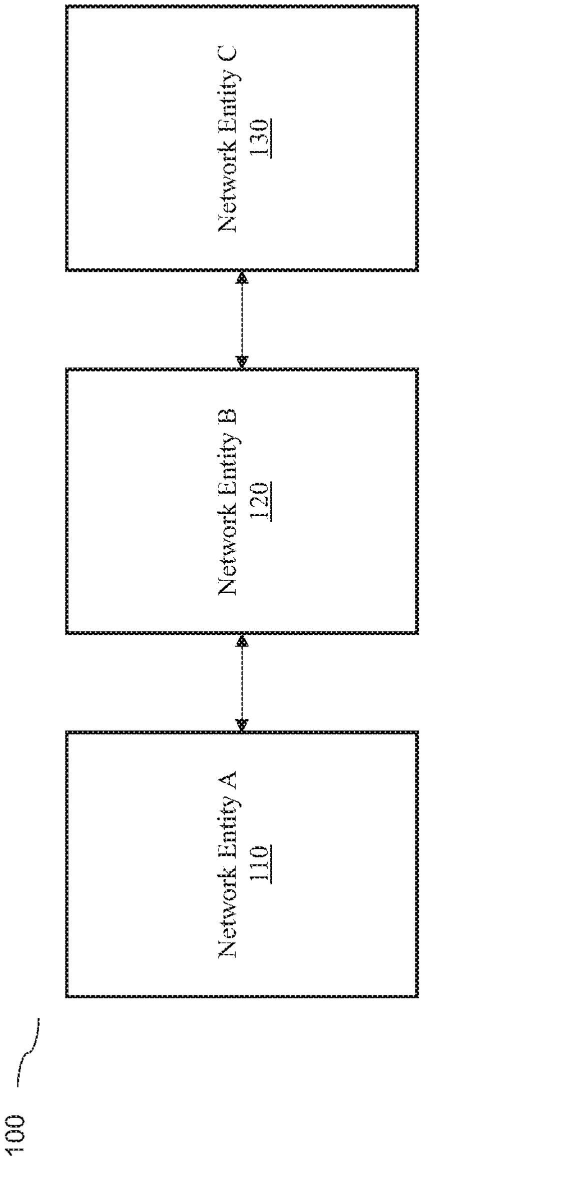
FIG. 1 illustrates a block diagram of an example system configuration for advertising authenticated network entities in a peer-to-peer configuration, according to one or more embodiments.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, devices, and the like, provided in the example embodiments of the present disclosure advertises authenticated network entities for enabling network entities to view authenticated supplicants in a telecommunication network.

According to embodiments, the system may create or receive a first authentication list for a first network entity that specify one or more network entities that are authenticated with the first network entity, and advertise such first authentication list to a second agent deployed in a second network entity that is authenticated with the first network entity.

Ultimately, example embodiments of the present disclosure enable network entities to view authenticated supplicants in the network, which in turn enable the development of a data store of information on authenticated supplicants for the network elements, thus building a comprehensive view of all the authenticated supplicants and defining an explicit level of trust. Further, in a hub-and-spoke configuration, the hub will store a repository of information for all the authenticated supplicants in the open front haul network; where a network mapping application may be developed on the hub to build a comprehensive topological overview of all the trusted authenticated supplicant nodes based on the data sent by each agent.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

FIG. 1 illustrates a block diagram of an example system configuration 100 for advertising authenticated network entities in a peer-to-peer configuration, according to one or more embodiments. As illustrated in FIG. 1, system configuration 100 may include a plurality of network entities (e.g., Network Entity A 110, Network Entity B 120, and Network Entity C 130) that are communicatively coupled to each other in a peer-to-peer configuration.

Each of the plurality of network entities 110, 120, 130 may include a system, a platform, a module, or the like, which may be configured to perform one or more operations or actions for advertising authenticated network entities in a network. According to embodiments, the plurality of network entities 110, 120, 130 may include entities such as RAN elements (e.g., O-RAN Centralized Unit (O-CU), O-RAN Distributed Unit (O-DU), O-RAN Radio Unit (O-RU), etc) and Transport Network elements.

According to embodiments, each of the plurality of network entities 110, 120, 130, may deploy an agent. Each of the agents may include a software or an entity having a predefined set of instructions. Each of the agents may also be autonomous, and may operate independently or in collaboration with other agents deployed in other network entities. Each of the agents may also be set up with information regarding other agents deployed in network entities that are directly connected to their respective network entities, either through manual configuration during bootstrapping or through automated techniques. According to embodiments, each of the agents may be able to support GET/POST/PUT/DELETE HTTP methods for communicating and exchanging information with each other.

According to embodiments, each of the agents may be configured to communicate directly with each other in the peer-to-peer configuration; where each of the agents may be configured to establish mutual authentication with each other. In particular, an agent may be configured to establish its identity to another agent by presenting a valid authentication credentials such as a digital certificate, and/or by presenting an application programming interface (API) key. Such mutual authentication between agents may improve security of communication between the plurality of network entities, and allows said agents to communicate via a secured connection. According to embodiments, mutual authentication between the agents may be established after a respective network entities are authenticated with each other.

According to embodiments, each of the agents may be configured to perform functions related to authentication lists (described below with reference to FIG. 4 and FIG. 14), such as creating, updating, and advertising the authentication lists to the hub.

Figure 2A:
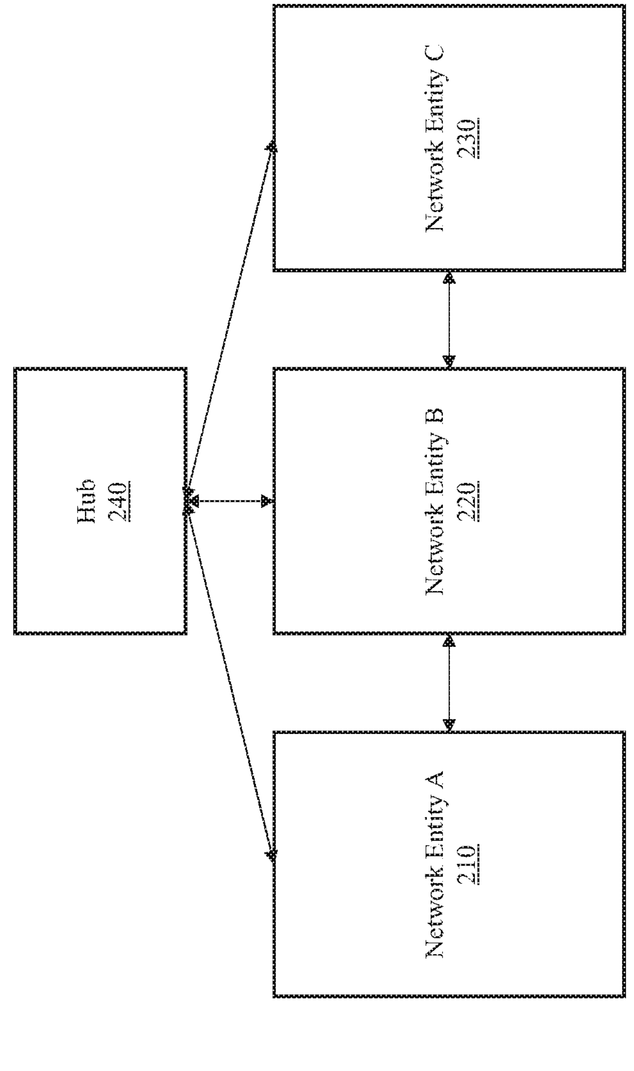
FIG. 2A illustrates a block diagram of an example system configuration for advertising authenticated network entities in a hub-and-spoke configuration, according to one or more embodiments.

FIG. 2A illustrates a block diagram of an example system configuration 200 for advertising authenticated network entities in a hub-and-spoke configuration, according to one or more embodiments. As illustrated in FIG. 2A, system configuration 200 may include a plurality of network entities (e.g., Network Entity A 210, Network Entity B 220, and Network Entity C 230) that are communicatively coupled to each other, and a hub 240 that is communicatively coupled to each of the plurality of network entities 210, 220, 230 in a hub-and-spoke configuration.

The hub 240 may include a system, a platform, a module, or the like, which may be configured to perform one or more operations or actions for advertising authenticated network entities in a network.

Figure 2B:
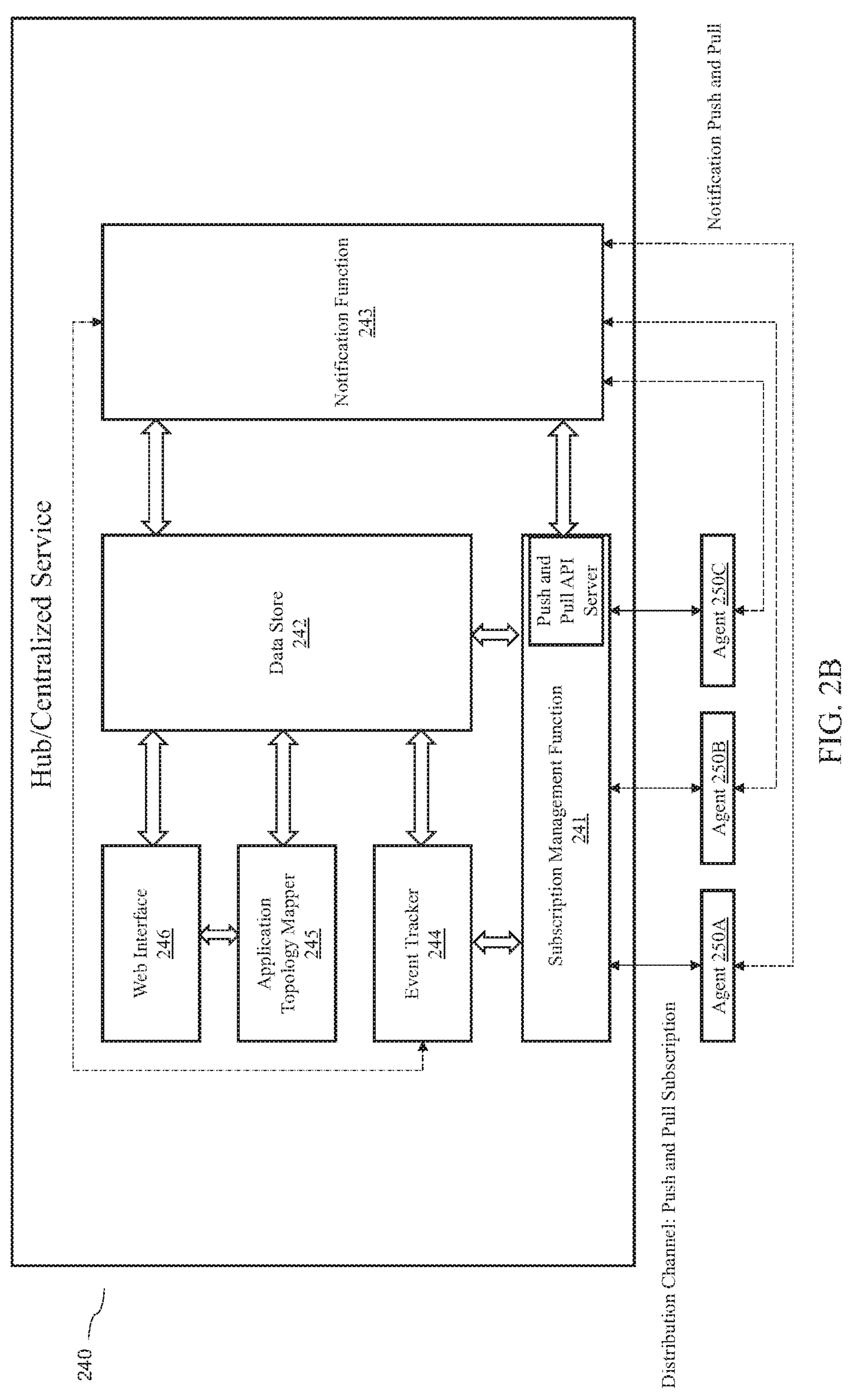
FIG. 2B illustrates an example architecture of a hub, according to one or more embodiments.

FIG. 2B illustrates an example architecture of the hub 240, according to one or more embodiments. As shown in FIG. 2B, the hub 240 may include components such a subscription management function 241 which includes integrated functions configured to perform operations in accordance with a Push and Pull Model and a Subscription Notify Model, data store 242 configured to handle database of authenticated supplicants in the open front haul network, notification function 243 configured to inform subscribers regarding updates in the real-time network traffic, event tracker 244 configured to monitor new subscriptions and any requests made by the hub 240 or agents 250A-250C, network (application) topology mapper 245 configured to provide a comprehensive map of all the authenticated supplicants in the network, and a web interface 246 configured to access and view the comprehensive map of all the authenticated supplicants in the network.

According to embodiments, the hub 240 may include a centralized service that acts as a central point of communication for the plurality of network entities 210, 220, 230. According to embodiments, the hub 240 may be hosted on any element in the open front haul network that has a communication path to the plurality of network entities 210, 220, 230, such as a Service Management Orchestrator (SMO) or an IEEE 802.1x Authentication Server.

According to embodiments, the plurality of network entities 210, 220, 230 may include entities such as RAN elements (e.g., O-RAN Centralized Unit (O-CU), O-RAN Distributed Unit (O-DU), O-RAN Radio Unit (O-RU), etc) and Transport Network elements.

According to embodiments, each of the plurality of network entities 210, 220, 230 may deploy an agent. Each of the agents 250A-250C may include a software or an entity having a predefined set of instructions. Each of the agents 250A-250C may also be autonomous, and may operate independently or in collaboration with other agents deployed in other network entities. Each of the agents 250A-250C may also be set up with information regarding other agents deployed in network entities that are directly connected to their respective network entities, either through manual configuration during bootstrapping or through automated techniques. According to embodiments, each of the agents 250A-250C may be able to support GET/POST/PUT/DELETE HTTP methods for communicating and exchanging information with each other.

According to embodiments, each of the agents 250A-250C may be configured to communicate indirectly with each other via the hub in the hub-and-spoke configuration, where the hub 240 may act as a central point of communication for the agents 250A-250C. According to embodiments, the hub 240 and the agents 250A-250C may exchange data (e.g., request and provide services and resources) in accordance with a Push and Pull Model and a Subscription Notify Model.

According to embodiments, each of the agents 250A-250C may be configured to establish mutual authentication with the hub. In particular, an agent may be configured to utilize mutual TLS (mTLS) to establish a secured connection with the hub, and the above models may be secured in the mTLS environment through encryption. Such mutual authentication between agents and the hub 240 may also improve security of communication between the plurality of network entities and the hub 240, and allows said agents to communicate indirectly via a secured connection. In particular, once the connection is established between the agents 250A-250C and the hub 240, all data that is transmitted between the agents 250A-250C and the hub 240 will be encrypted using TLS, which provides data confidentiality and integrity. As such, even if an attacker intercepts the transmitted data, they will not be able to read or tamper with the data.

According to embodiments, each of the agents 250A-250C may be configured to perform functions related to authentication lists (described below with reference to FIG. 4 and FIG. 14), such as creating, updating, and advertising the authentication lists to the hub 240.

According to embodiments, each of the plurality of network entities 110, 120, 130, 210, 220, 230 may be configured to perform the above functions related to authentication lists, without the agents 250A-250C. In particular, each of the plurality of network entities 110, 120, 130, 210, 220, 230 may utilize an Extensible Authentication Protocol (EAP) over LAN (EAPoL) notifications to inform an authenticated network entities (i.e., authenticated based on IEEE 802.1x) regarding authentication lists. However, such process would involve implementing changes to the IEEE 802.1x specification, such as in the IEEE 802.1x EAP notifications methods. On the other hand, deploying the agents to perform the above functions related to authentication lists, allows each of the plurality of network entities 110, 120, 130, 210, 220, 230 to advertise the authenticated network entities without changing the IEEE 802.1x specification.

It can be understood that the configuration illustrated in FIG. 1, FIG. 2A, and FIG. 2B are simplified for descriptive purpose, and is not intended to limit the scope of the present disclosure in any way. For example, in practice, the number of network entities in the system can be any number.

Example operations performable by the plurality of network entities 110, 120, 130 for advertising authenticated network entities are described below with reference to FIG. 4, and example operations performable by the hub 240 for advertising authenticated network entities are described below with reference to FIG. 10. Further, several example components which may be included in the plurality of network entities 110, 120, 130 and the hub 240, according to one or more embodiments, are described below with reference to FIG. 3.

Figure 3:
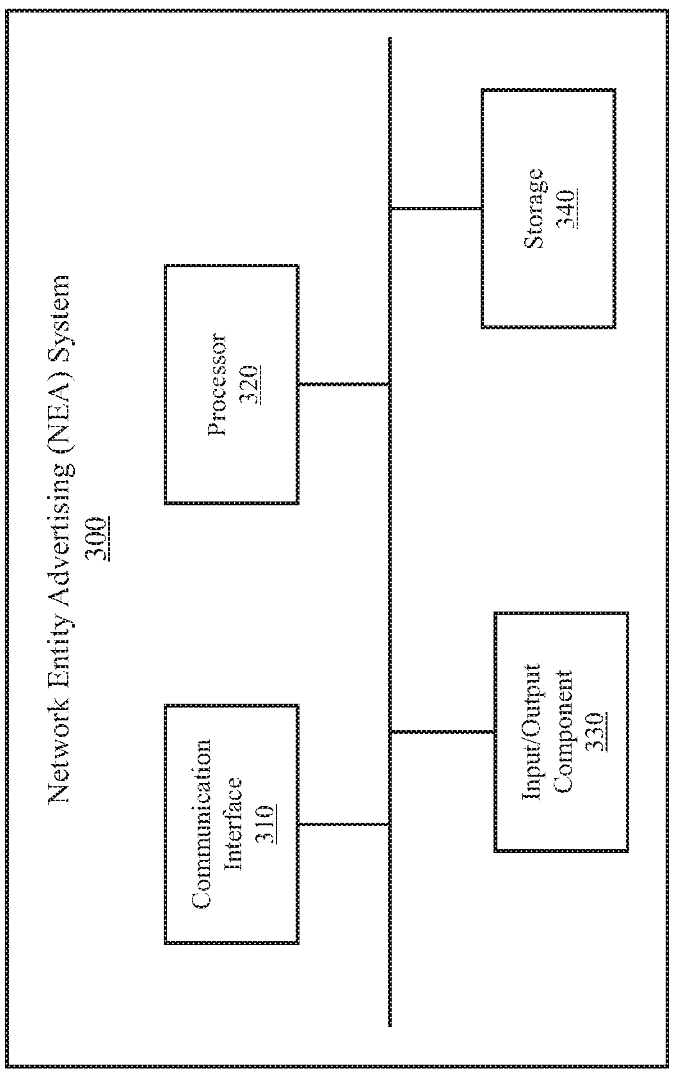
FIG. 3 illustrates a block diagram of example components in a network entity advertising (NEA) system, according to one or more embodiments.

FIG. 3 illustrates a block diagram of example components in a network entity advertising (NEA) system 300, according to one or more embodiments. The NEA system 300 may corresponds to at least one network entity of the plurality of network entities 110, 120, 130 in FIG. 1, or corresponds to the hub 240 in FIG. 2A, thus the features associated with the plurality of network entities 110, 120, 130 and the hub 240 and the NEA system 300 may be similarly applicable to each other, unless being explicitly described otherwise.

As illustrated in FIG. 3, the NEA system 300 may include at least one communication interface 310, at least one processor 320, at least one input/output component 330, and at least one storage 340, although it can be understood that the NEA system 300 may include more or less components than as illustrated in FIG. 3, and/or may be arranged in a manner different from as illustrated in FIG. 3, without departing from the scope of the present disclosure.

The communication interface 310 may include at least one transceiver-like component (e.g., a transceiver, a separate receiver and transmitter, a bus, etc.) that enables the components of the NEA system 300 to communicate with each other and/or to communicate with one or more components external to the NEA system 300, such as via a wired connection, a wireless connection, or a combination of wired and wireless connections.

For instance, the communication interface 310 may couple the processor 320 to the storage 340 to thereby enable them to communicate and to interoperate with each other in performing one or more operations. As another example, communication interface 310 may couple the NEA system 300 (or one or more components included therein) to a separate network entity, so as to enable them to communicate and to interoperate with each other.

According to one or more embodiments, the communication interface 310 may include one or more application programming interfaces (APIs) which allow the NEA system 300 (or one or more components included therein) to communicate with one or more software applications.

The input/output component 330 may include at least one component that permits the NEA system 300 to receive information and/or to provide output information. It can be understood that, in some embodiments, the input/output component 330 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 340 may include one or more storage mediums suitable for storing data, information, and/or computer-executable instructions therein. According to embodiments, the storage 340 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 320. Additionally or alternatively, the storage 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 340 may be configured to store information, such as raw data, metadata, or the like. Additionally or alternatively, the storage 340 may be configured to store one or more information associated with one or more operations performed by the processor 320. For instance, the storage 340 may store information defining the historical operation(s) performed by the processor 320 to advertise authenticated network entities, one or more results of operations performed by the processor 320, or the like. Further, the storage 340 may store data or information required in advertising authenticated network entities. For instance, the storage 340 may store authentication lists and/or trust lists (described below with reference to FIG. 6, FIG. 9, and FIG. 14).

In some implementation, the storage 340 may include a plurality of storage mediums, and the storage 340 may be configured to store a duplicate or a copy of at least a portion of the information in the plurality of storage mediums, for providing redundancy and for backing- up the information or the associated data. Furthermore, the storage 340 may also store computer-readable or computer-executable instructions which, when being executed by one or more processors (e.g., processor 320), causes the one or more processors to perform one or more actions/operations described herein The processor 320 may include at least one processor capable of being programmed or being configured to perform a function(s) or an operation(s) described herein. For instance, the processor 320 may be configured to execute computer-executable instructions stored in at least one storage medium or a memory storage (e.g., storage 340, etc.) to thereby perform one or more actions or one or more operations described herein.

According to embodiments, the processor 320 may be configured to receive (e.g., via the communication interface 310, via the input/output component 330, etc.) one or more signals and/or one or more user inputs defining one or more instructions for performing one or more operations. Further, the processor 320 may be implemented in hardware, firmware, or a combination of hardware and software. For instance, processor 320 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 320 may be configured to collect, to extract, and/or to receive one or more information (in the form of signal or data, etc.), and to process the received one or more information to thereby advertise authenticated network entities.

Descriptions of several example operations which may be performed by the processor 320 are provided below with reference to FIG. 4 to FIG. 14.

Example Operations for Advertising Authenticated Network Entities in a Peer-to-Peer Configuration in the Present Disclosure In the following, several example operations performable by the NEA system of the present disclosure are described with reference to FIG. 4 to FIG. 8.

Figure 4:
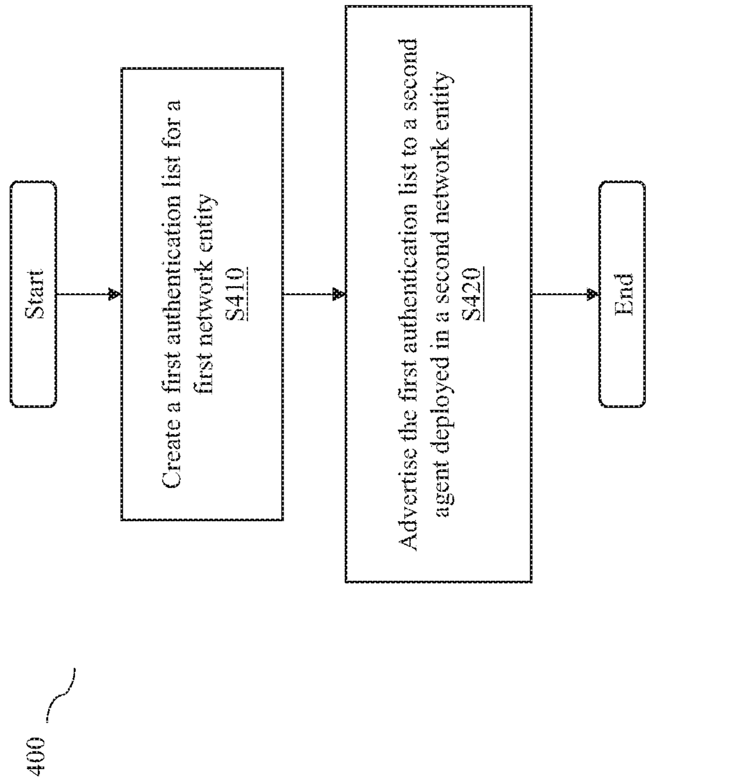
FIG. 4 illustrates a flow diagram of an example method for advertising authenticated network entities in a peer-to-peer configuration, according to one or more embodiments.

FIG. 4 illustrates a flow diagram of an example method 400 for advertising authenticated network entities in a peer-to-peer configuration, according to one or more embodiments. One or more operations in method 400 may be performed by at least one processor (e.g., processor 320) of the NEA system, which may corresponds to at least one network entity (i.e., first network entity) of the plurality of network entities in the system.

As illustrated in FIG. 4, at operation S410, the at least one processor may be configured to create a first authentication list for the first network entity. According to embodiments, the first authentication list may specify one or more network entities that are authenticated with the first network entity. In particular, according to embodiments, the first authentication list may specify one or more MAC address of one or more ports of the first network entity (herein after "one or more first MAC address"), and one or more MAC address of one or more ports of one or more network entities authenticated with the one or more first MAC address. According to embodiments, the first authentication list may also specify a role of the one or more ports of the first network entity, such as an authenticator and a supplicant.

Figure 5:
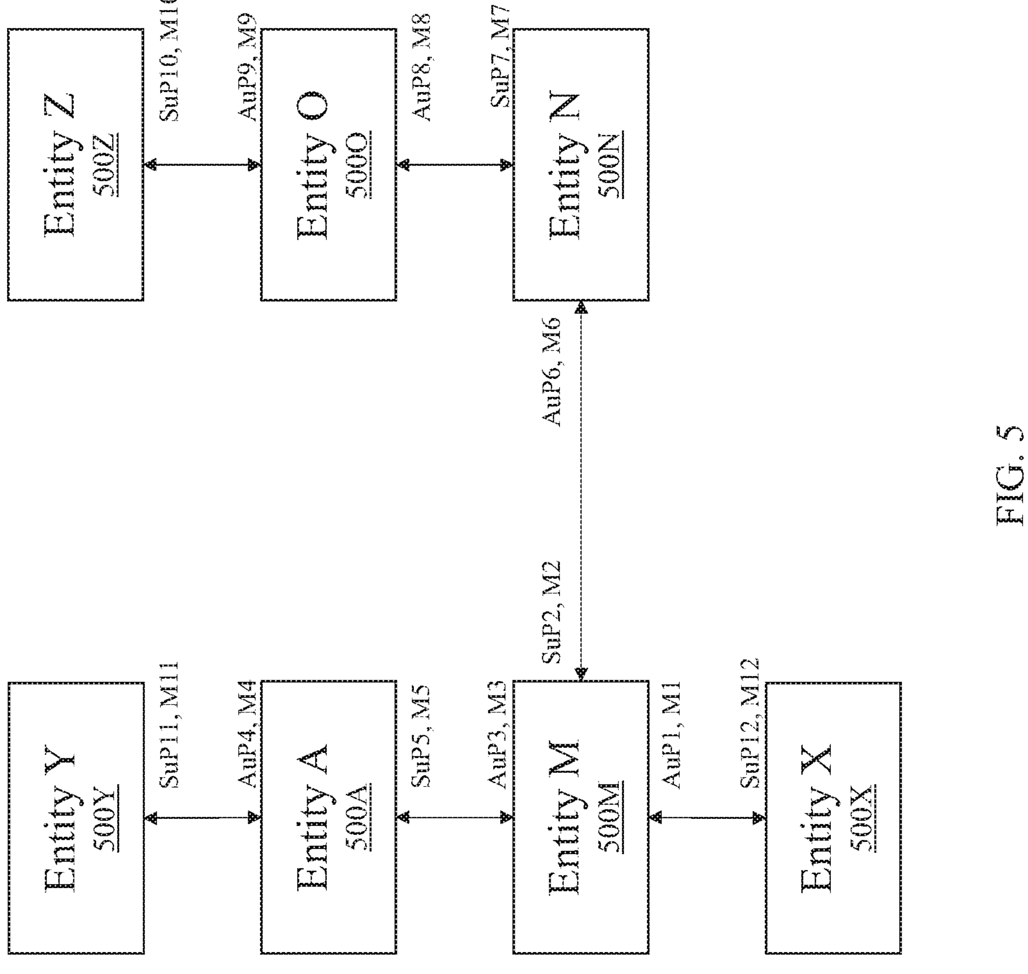
FIG. 5 illustrates an example configuration of network entities in a peer-to-peer configuration, according to one or more embodiments.

For example, referring to FIG. 5, which illustrates an example configuration of network entities in a peer-to-peer configuration, according to one or more embodiments. As shown in FIG. 5, the system may comprise 7 network entities: Network Entity Y 500Y, Network Entity A 500A, Network Entity M 500M, Network Entity X 500X, Network Entity Z 500Z, Network Entity O 500O, and Network Entity N 500N.

As shown in FIG. 5, for example, Network Entity A 500A is authenticated with Network Entity Y 500Y and Network Entity M 500M; where port AuP4 of Network Entity A 500A has a MAC address M4 and a role of an authenticator that is authenticated with port SuP11 of Network Entity Y 500Y, which as a MAC address M11 and a role of a supplicant; and where port SuP5 of Network Entity A 500A has a MAC address M5 and a role of a supplicant that is authenticated with port AuP3 of Network Entity M 500M, which as a MAC address M3 and a role of an authenticator. Similar explanation applies to Network Entity Y 500Y, Network Entity M 500M, Network Entity X 500X, Network Entity Z 500Z, Network Entity O 500O, and Network Entity N 500N.

It may be understood that the authentication between the network entities may be performed based on a port-based network access control IEEE 802.1x with a IEEE 802.1x authentication server. In particular, as part of the Extensible Authentication Protocol (EAP) over LAN (EAPOL) process, a network entity acting as an authenticator request an identity information from network entities acting as the supplicants, and relays said identity information to the authentication server. The authentication server then validates the identity information of the network entities acting as the supplicants and determines if said network entities are authorized to access the network. If said network entities acting as the supplicants are authorized to access the network, said network entities acting as the supplicants are authenticated with said network entity acting as the authenticator. Through the above authentication process, the network entities involved in the authentication process are able to obtain information such as port identity, port MAC address, role of the ports, authorization status, etc from each other.

FIG. 6 illustrates examples of authentication lists 600A, 600M, 600N, 600O, according to one or more embodiments. As shown in FIG. 6, for example, Network Entity A may be configured to create its authentication list 600A, where such authentication list 600A may specify the MAC addresses M4 and M5 of ports AuP4 and SuP5 of Network Entity A, as well as the MAC addresses M11 of ports SuP11 of Network Entity Y that is authenticated with port AuP4, and the MAC addresses M3 of ports AuP3 of Network Entity M that is authenticated with port SuP5. Further, the authentication list 600A for Network Entity A may also specify that port AuP4 of Network Entity A has a role of an authenticator, and port SuP5 of Network Entity A has a role of a supplicant. As such, the authentication list may specify Network Entity Y and Network Entity M (which have ports SuP11 and AuP3) that are authenticated with Network Entity A (which has ports AuP4 and SuP5). Similar explanation applies to Network Entity Y, Network Entity M, Network Entity X, Network Entity Z, Network Entity O, and Network Entity N. Since Network Entity Y, Network Entity X, and Network Entity Z have only one port, the authentication list for said network entities are omitted from FIG. 6. The method then proceeds to operation S420.

According to embodiments, the at least one processor may be configured to perform, at a regular period of time, an SNMPv3 query of an OID "1.3.111.2.802.1.1.15.2.2.3". Subsequently, based on a SNMPv3 response (which would show the status of an Object-Type "ieee8021XPaeLogonGroup"), the at least one processor may then create the authentication list.

It may be understood that, if a network entity is not authenticated with the first network entity (e.g., if such network entity failed authentication), the first network entity may block traffic to and from such network entity, and may not create or update the first authentication list to include such network entity.

At operation S420, the at least one processor may be configured to advertise the first authentication list to a second agent deployed in a second network entity. According to embodiments, the first network entity and the second network entity may be authenticated with each other.

For example, returning to FIG. 5 and FIG. 6, Network Entity A 500A may be configured to advertise the authentication list 600A for Network Entity A 500A shown in FIG. 6 to an agent deployed in Network Entity M 500M (which is authenticated with Network Entity A 500A).

According to embodiments, the creating of the first authentication list may be done by a first agent that is deployed in the first network entity, and the advertising of the first authentication list may be done via an advertising interface by the first agent. According to embodiments, the first agent may be mutually authenticated with the second agent. According to embodiments, the advertising interface may include an interface such as a REST API.

Examples of operations for advertising an authentication list in a peer-to-peer configuration are described below with reference to FIG. 7.

Upon performing operation S420, the method 400 may be ended or be terminated. Alternatively, method 400 may return to operation S420, such that the at least one processor may be configured to repeatedly perform, for at least a predetermined amount of time, the advertising the first authentication list (at operation S420). For instance, the at least one processor may update the first authentication list in response to a change in the network, and then restart the advertising the first authentication list (at operation S420).

Examples of operations for updating an authentication list in a peer-to-peer configuration are described below with reference to FIG. 8A and FIG. 8B.

To this end, the system of the present disclosure may advertise authenticated network entities in the network.

Example Operations for Advertising an Authentication List in a Peer-to-Peer Configuration in the Present Disclosure In the following several example operations performable by the at least one processor for advertising an authentication list are described with reference to FIG. 7.

Figure 7:
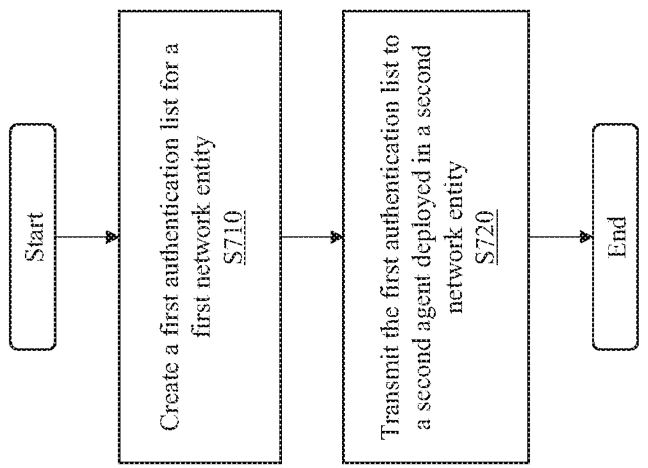
FIG. 7 illustrates a flow diagram of an example method for advertising an authentication list in a peer-to-peer configuration, according to one or more embodiments.

FIG. 7 illustrates a flow diagram of an example method 700 for advertising an authentication list in a peer-to-peer configuration, according to one or more embodiments. One or more operations of method 700 may be part of operation S410 and S420 in method 400, and may be performed by at least one processor (e.g., processor 320) of the NEA system, which may corresponds to at least one network entity (i.e., first network entity) of the plurality of network entities in the system.

As illustrated in FIG. 7, at operation S710, the at least one processor may be configured to create a first authentication list for the first network entity, in the similar manner as described above in relation to operation S410. The method may then proceed to operation S720.

At operation S720, the at least one processor may be configured to transmit the first authentication list to a second agent deployed in a second network entity. According to embodiments, the first network entity and the second network entity may be authenticated with each other.

For example, returning to FIG. 5 and FIG. 6, Network Entity A may be configured to transmit the authentication list for Network Entity A shown in FIG. 6 to an agent deployed in Network Entity M (which is authenticated with Network Entity A).

According to embodiments, the at least one processor may be configured to transmit the first authentication list to the second agent, in response to receiving a request to transmit the first authentication list from the second agent. Similarly, the at least one processor may be configured to transmit a request to receive an authentication list from the second agent.

According to embodiments, the creating of the first authentication list may be done by a first agent that is deployed in the first network entity, and the transmitting of the first authentication list may be done via an advertising interface by the first agent. According to embodiments, the first agent may be mutually authenticated with the second agent. According to embodiments, the advertising interface may include an interface such as a REST API.

Upon performing operation S720, the method 700 may be ended or be terminated. Alternatively, method 700 may return to operation S720, such that the at least one processor may be configured to repeatedly perform, for at least a predetermined amount of time, the transmitting the first authentication list (at operation S720). For instance, the at least one processor may update the first authentication list in response to a change in the network, and then restart the transmitting the first authentication list (at operation S720).

Examples of operations for updating an authentication list in a peer-to-peer configuration are described below with reference to FIG. 8A and 8B.

To this end, the system of the present disclosure may advertise an authentication list in the network.

Example Operations for Updating an Authentication List in a Peer-to-Peer Configuration in the Present Disclosure In the following several example operations performable by the at least one processor for updating an authentication list are described with reference to FIG. 8A and FIG. 8B.

Figures 8A, 8B:
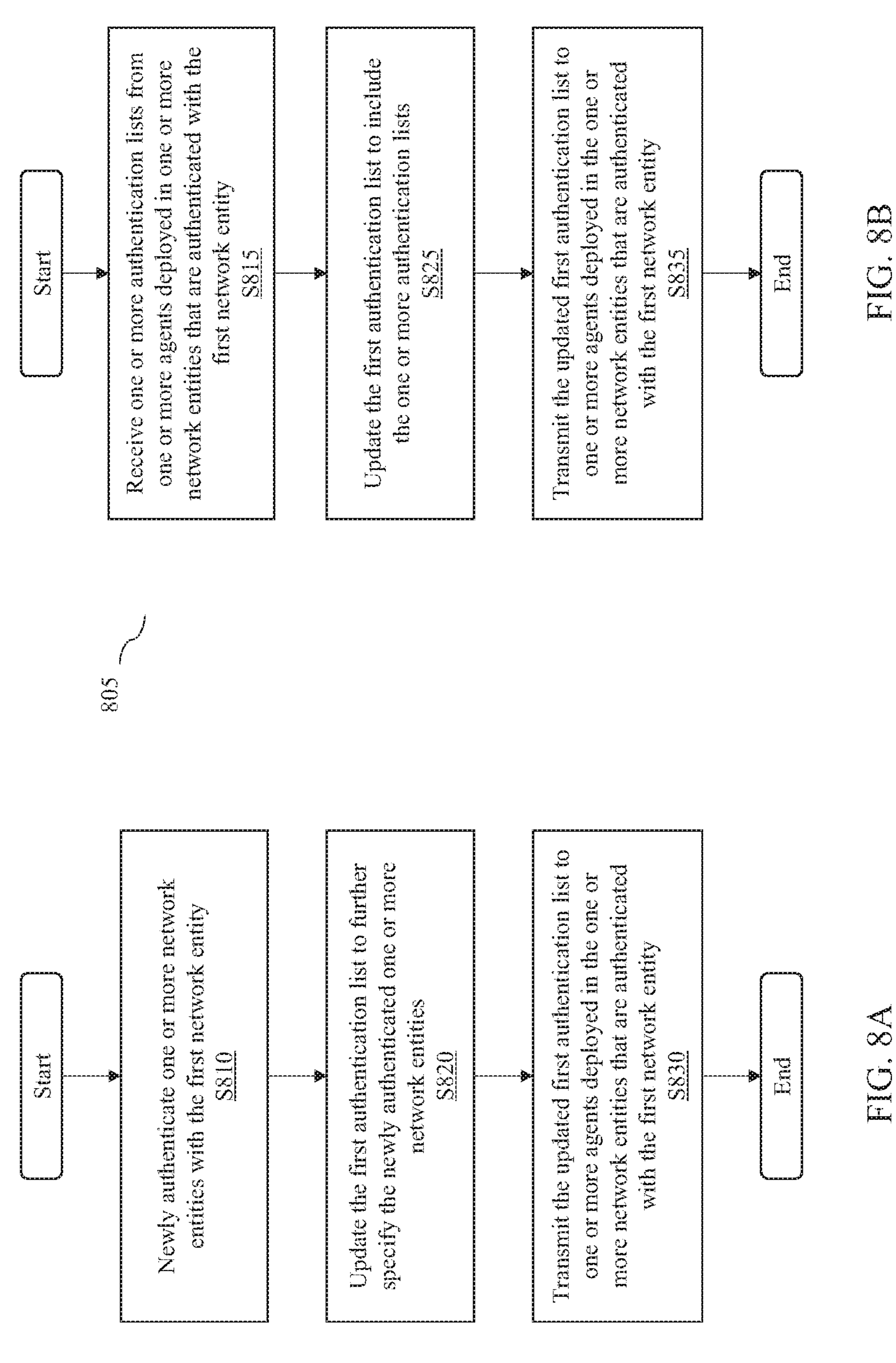
FIG. 8A illustrates a flow diagram of an example method for updating an authentication list in response to a newly authenticated network entity in a peer-to-peer configuration, according to one or more embodiments.
FIG. 8B illustrates a flow diagram of an example method for updating an authentication list in response to another authentication list received from a network entity in a peer-to-peer configuration, according to one or more embodiments.

FIG. 8A illustrates a flow diagram of an example method 800 for updating an authentication list in response to a newly authenticated network entity in a peer-to-peer configuration, according to one or more embodiments. One or more operations in method 800 may be performed after the first authentication list is created, and may be performed by the at least one processor (e.g., processor 320) of the NEA system, which may corresponds to at least one network entity (i.e., first network entity) of the plurality of network entities in the system.

As illustrated in FIG. 8A, at operation S810, the at least one processor may be configured to newly authenticate one or more network entities with the first network entity. According to embodiments, the newly authenticated one or more network entities may include one or more network entities that are authenticated with the first network entity after the first authentication list is created, and that are not indicated in the first authentication list.

For example, returning to FIG. 5 and FIG. 6, after Network Entity A created its the authentication list indicating Network Entity Y (by specifying port SuP11 (M11) of Network Entity Y in the authentication list), Network Entity A is newly authenticated with Network Entity M (which is not yet indicated in the in the authentication list). The method may then proceed to operation S820.

At operation S820, the at least one processor may be configured to update the first authentication list to further specify the newly authenticated one or more network entities. For example, returning to FIG. 5 and FIG. 6, after Network Entity A is newly authenticated with Network Entity M, Network Entity A may be configured to update its authentication list to further specify Network Entity M (e.g., by adding a new row to specify port AuP3 (M3) of Network Entity M in the authentication list along with the corresponding port Sup5 (M5) of Network Entity A) as shown in the authentication list for Network Entity A in FIG. 6. The method may then proceed to operation S830.

At operation S830, the at least one processor may be configured to transmit the updated first authentication list to one or more agents deployed in the one or more network entities that are authenticated with the first network entity. For example, returning to FIG. 5 and FIG. 6, Network Entity A may be configured to transmit its updated authentication list (i.e., authentication list for Network Entity A shown in FIG. 6) to an agent deployed in Network Entity Y and to an agent deployed in Network Entity M.

Upon performing operation S830, the method 800 may be ended or be terminated. Alternatively, method 800 may return to operation S810, such that the at least one processor may be configured to repeatedly perform, for at least a predetermined amount of time, the newly authenticating one or more network entities (at operation S810), the updating the first authentication list (at operation S820), and the transmitting the updated first authentication list (at operation S830). For instance, the at least one processor may continue to find more network entities to authenticate with the first network entity, and then restart the newly authenticating one or more network entities (at operation S810), the updating the first authentication list (at operation S820), and the transmitting the updated first authentication list (at operation S830).

FIG. 8B illustrates a flow diagram of an example method 805 for updating an authentication list in response to another authentication list received from a network entity in a peer-to-peer configuration, according to one or more embodiments. One or more operations in method 805 may be performed after the first authentication list is created, and may be performed by at least one processor (e.g., processor 320) of the NEA system, which may corresponds to at least one network entity (i.e., first network entity) of the plurality of network entities in the system.

As illustrated in FIG. 8B, at operation S815, the at least one processor may be configured to receive one or more authentication lists from one or more agents deployed in one or more network entities that are authenticated with the first network entity. According to embodiments, the at least one processor may be configured to receive a second authentication list from a second agent deployed in a second network entity that is authenticated with the first network entity. According to embodiments, the second authentication list may specify one or more network entities that are authenticated with the second network entity in the similar manner as the first authentication list.

For example, returning to FIG. 5 and FIG. 6, Network Entity A may be configured to receive an authentication list for Network Entity M from an agent deployed in Network Entity M (i.e., authentication list for Network Entity M shown in FIG. 6). The method may then proceed to operation S825.

It may be understood that the one or more authentication lists may be created by the respective one or more agents in the similar manner as described above for the first agent.

At operation S825, the at least one processor may be configured to update the first authentication list to include the one or more authentication lists. For example, returning to FIG. 5 and FIG. 6, Network Entity A may be configured to update its authentication list to include the rows for ports AuP1, Aup3, and SuP2 in the authentication list for Network Entity M into its authentication list. The method may then proceed to operation S835.

At operation S835, the at least one processor may be configured to transmit the updated first authentication list to one or more agents deployed in the one or more network entities that are authenticated with the first network entity. For example, returning to FIG. 5 and FIG. 6, Network Entity A may be configured to transmit its updated authentication list (i.e., authentication list for Network Entity A shown in FIG. 6 that further includes the rows for ports AuP1, Aup3, and SuP2 in the authentication list for Network Entity M) to an agent deployed in Network Entity Y and to an agent deployed in Network Entity M.

Upon performing operation S835, the method 805 may be ended or be terminated. Alternatively, method 805 may return to operation S815, such that the at least one processor may be configured to repeatedly perform, for at least a predetermined amount of time, the receiving the one or more authentication lists (at operation S815), the updating the first authentication list (at operation S825), and the transmitting the updated first authentication list (at operation S835). For instance, the at least one processor may continue to receive more authentication lists, and then restart the receiving the one or more authentication lists (at operation S815), the updating the first authentication list (at operation S825), and the transmitting the updated first authentication list (at operation S835).

According to embodiments, the at least one processor may be configured to transmit a notification to the one or more agents to indicate a change in the network. For example, the at least one processor may be configured to transmit a notification that the first network entity is newly authenticated with a network entity, that the first authentication list has been updated, etc. According to embodiments, the at least one processor may be configured to transmit the updated first authentication list to the one or more agents, in response to receiving a request to transmit the updated first authentication list from the one or more agents. Similarly, the at least one processor may be configured to receive a notification from the one or more agent, and transmit a request to receive an updated authentication list from the one or more agents.

According to embodiments, the receiving of the one or more authentication lists, the updating of the first authentication list, and the transmitting of the updated first authentication list may be done by a first agent that is deployed in the first network entity. According to embodiments, the transmitting of the updated first authentication list as well as the transmitting and receiving of notifications and requests may be done via an advertising interface. According to embodiments, the advertising interface may include an interface such as a REST API. According to embodiments, the first agent may be mutually authenticated with the one or more agents deployed in the one or more network entities that are authenticated with the first network entity.

The above processes allow for the agents to be readily informed of any changes to the network, and allows the agent to always have the most recent version of the authentication list.

Figure 9A:
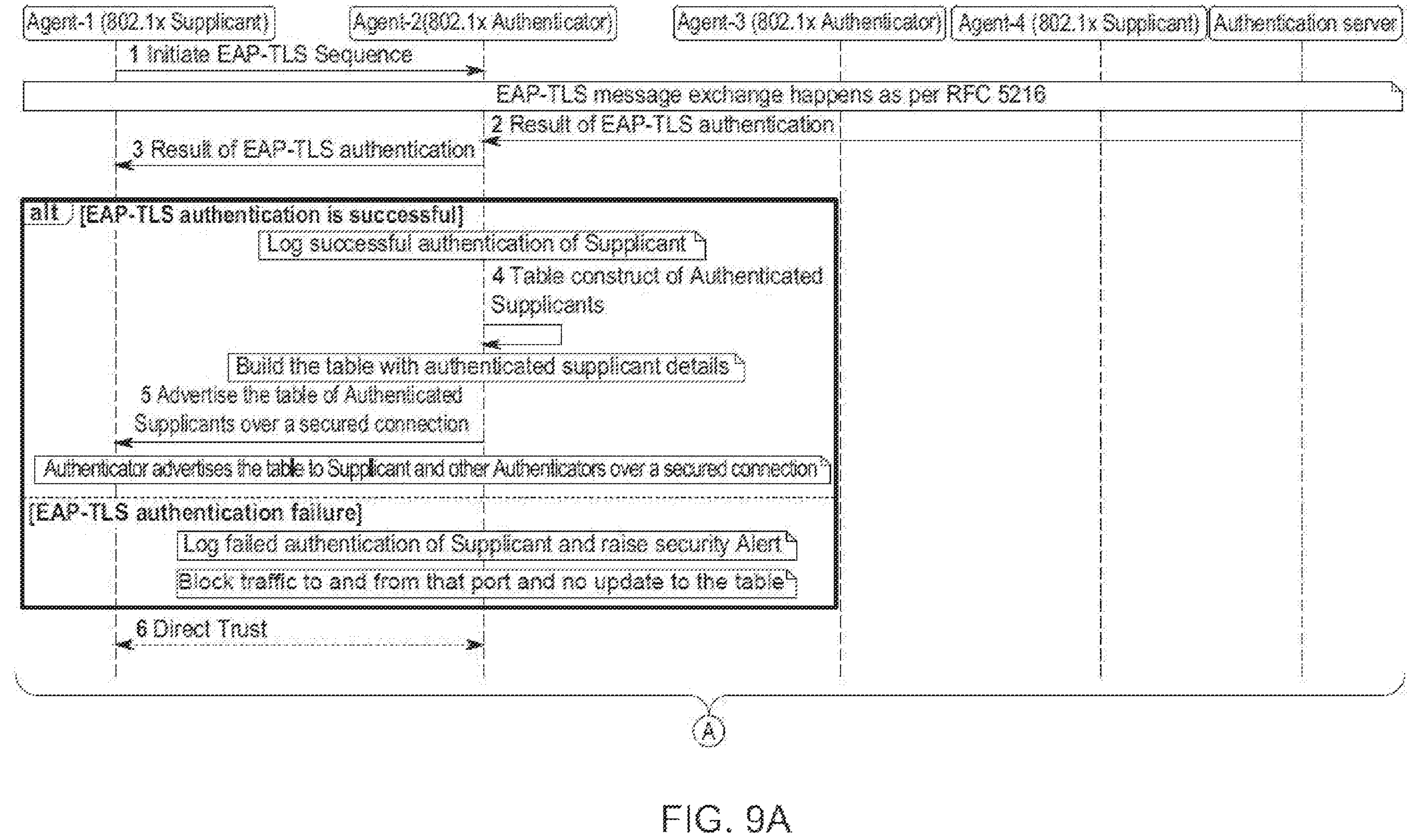
FIGS. 9A to 9C illustrate an example flow sequence for advertising authenticated network entities in a peer-to-peer configuration, according to one or more embodiments.
Figure 9B:
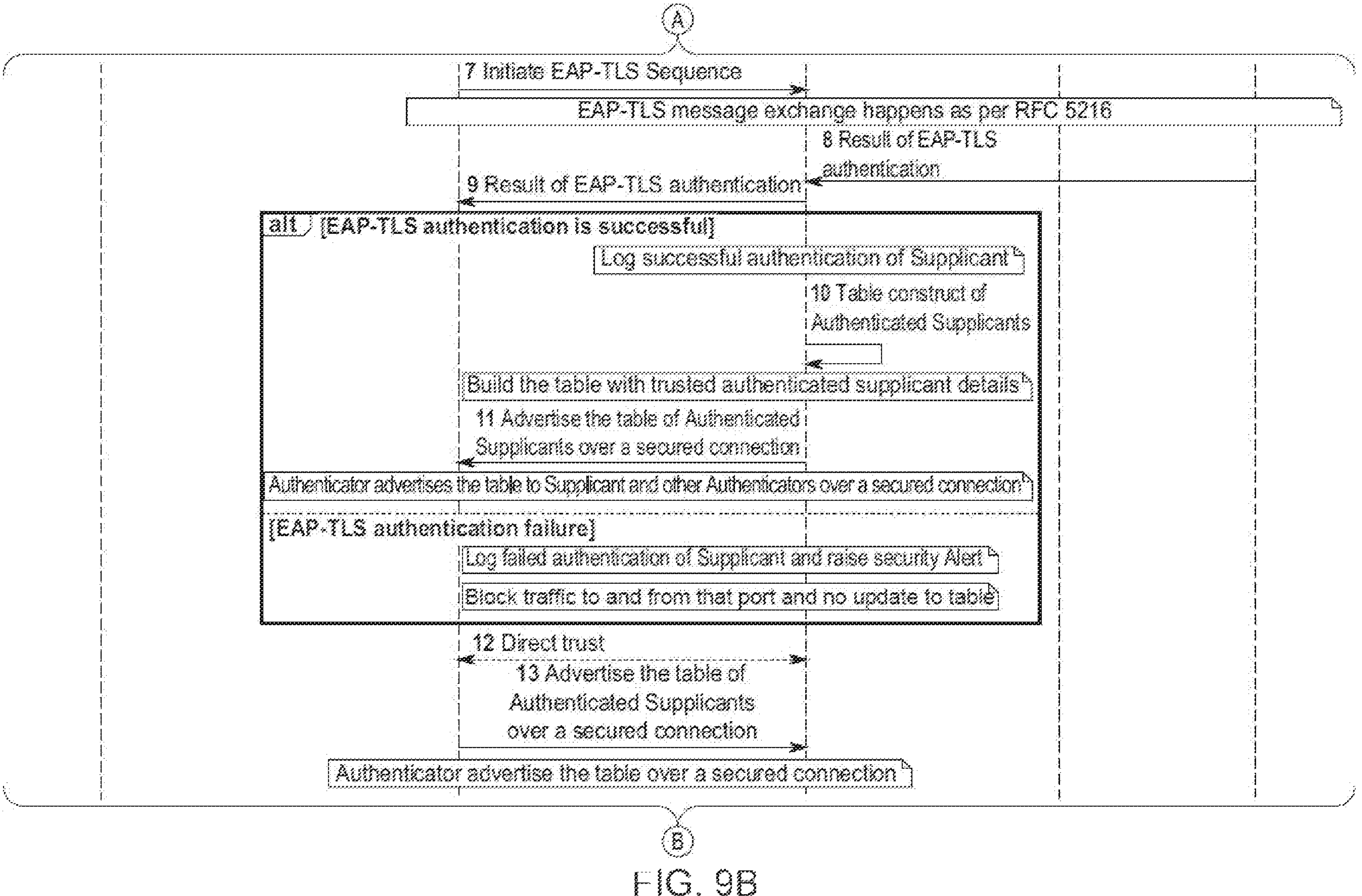
Figure 9C:
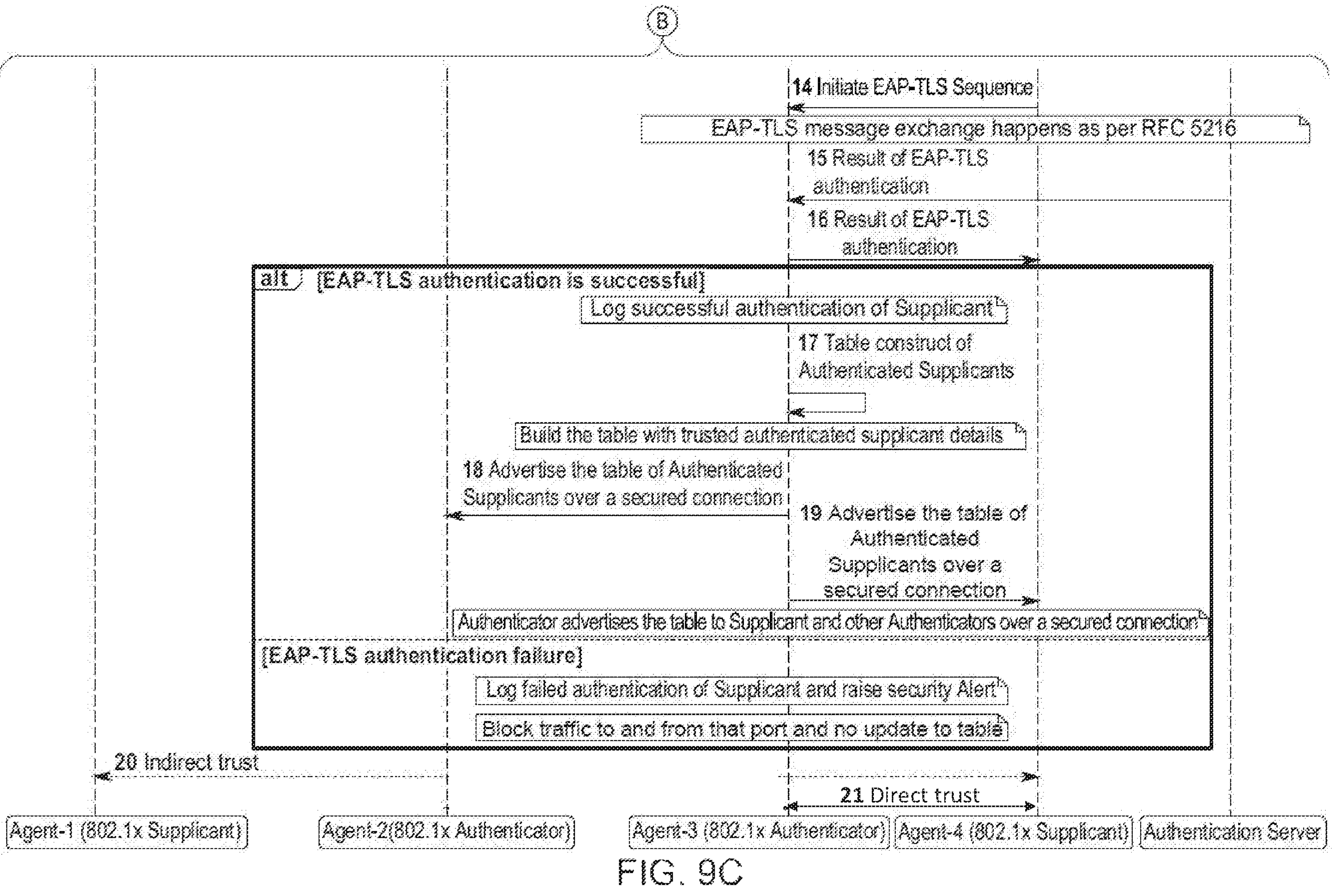

Example Sequence for Advertising Authenticated Network Entities in a Peer-to-Peer Configuration in the Present Disclosure FIGS. 9A to 9C illustrate an example flow sequence for advertising authenticated network entities in a peer-to-peer configuration, according to one or more embodiments. The example flow sequence shown in FIGS. 9A to 9C involve processes explained above in relation to method 400, 700, 800, and 805, and is split into 3 parts for clarity.

As shown in FIGS. 9A to 9C, the network includes 4 network entities deploying 4 agents (Agent 1, Agent 2, Agent 3, and Agent 4), and an Authentication Server.

During steps 1 to 3, network entity 1 performs authentication with network entity 2 in accordance with RFC 5216 EAP-TLS Authentication Protocol of IEEE 802.1x. If the authentication is successful, the sequence proceeds to step 4. On the other hand, if the authentication is not successful, network entity 2 may raise a security alert, and block data traffic to and from network entity 1.

During steps 4 to 5, network entity 2 creates its authentication list, and advertises its authentication list to network entity 1 over a secured connection.

During step 6, network entity 2 forms a direct trust with network entity 1. For example, once the authentication list of network entity 2 is received by network entity 1, network entity 1 may be configured to create a trust list that specify that a trust level between network entity 2 and network entity 1 is a direct trust based on the authentication list of network entity 2 that specify network entity 1.

During steps 7 to 12, network entity 3 performs authentication with network entity 2, creates its authentication list, advertises its authentication list to network entity 2, and forms a direct trust with network entity 2, in the similar manner as for network entity 1 and network entity 2 described in steps 1 to 6.

During step 13, network entity 2 advertises its authentication list to network entity 3. In particular, since network entity 2 is newly authenticated with network entity 3 and received an authentication list from network entity 3, network entity 2 may update its authentication list to include the authentication list received from network entity 3, and advertise its updated authentication list to network entity 3. Similarly, network entity 3 may update its authentication list to include the authentication list received from network entity 2.

During steps 14 to 16, network entity 3 performs authentication with network entity 4, in the similar manner as for network entity 1 and network entity 2 described in steps 1-3.

During step 17, network entity 3 updates its authentication list to further specify the newly authenticated network entity 4.

During steps 18 to 19, network entity 3 advertises its updated authentication list to network entity 2 and network entity 4.

During step 20, network entity 4 forms an indirect trust with network entity 1. For example, since network entity 1 is specified in the authentication list of network entity 2, which is advertised to network entity 3 (step 13), and since network entity 3 updated its authentication list to include the authentication list of network entity 2 and advertised it to network entity 4 (step 19), network entity 4 may update its authentication list to include the authentication list of network entity 3, the authentication list of network entity 4 may specify network entity 1. As such, network entity 4 may be configured to create a trust list that specify that a trust level between network entity 4 and network entity 1 is an indirect trust based on the authentication list of network entity 4 that specify network entity 1.

During step 21, network entity 4 forms a direct trust with network entity 3, in the similar manner as for network entity 1 and network entity 2 described in step 6.

Example Operations for Advertising Authenticated Network Entities in a Hub-and-Spoke Configuration in the Present Disclosure In the following, several example operations performable by the NEA system of the present disclosure are described with reference to FIG. 10 to FIG. 14.

Figure 10:
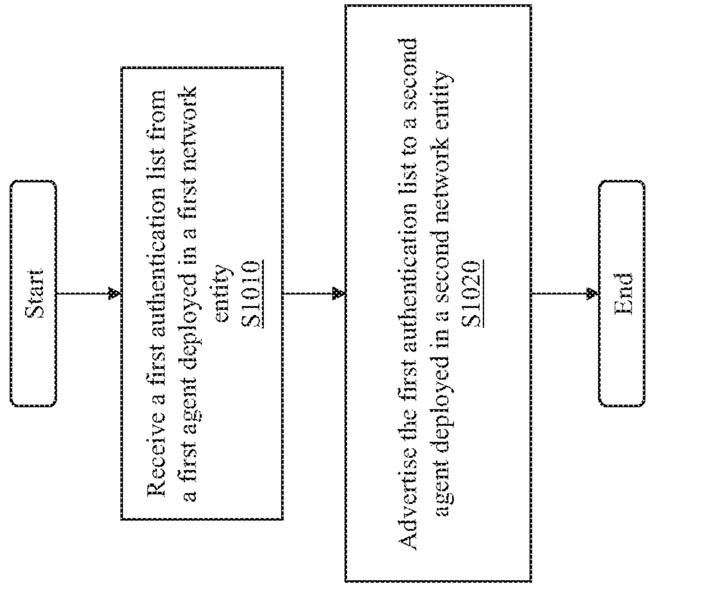
FIG. 10 illustrates a flow diagram of an example method for advertising authenticated network entities in a hub-and-spoke configuration, according to one or more embodiments.

FIG. 10 illustrates a flow diagram of an example method 1000 for advertising authenticated network entities in a hub-and-spoke configuration, according to one or more embodiments. One or more operations in method 1000 may be performed by at least one processor (e.g., processor 320) of the NEA system, which may corresponds to the hub communicatively coupled to the plurality of network entities in the system.

As illustrated in FIG. 10, at operation S1010, the at least one processor may be configured to receive a first authentication list from a first agent deployed in a first network entity. The first authentication list may be similar to the first authentication list and may be created by the first agent in the similar manner as described above in the peer-to-peer configuration.

Figure 11:
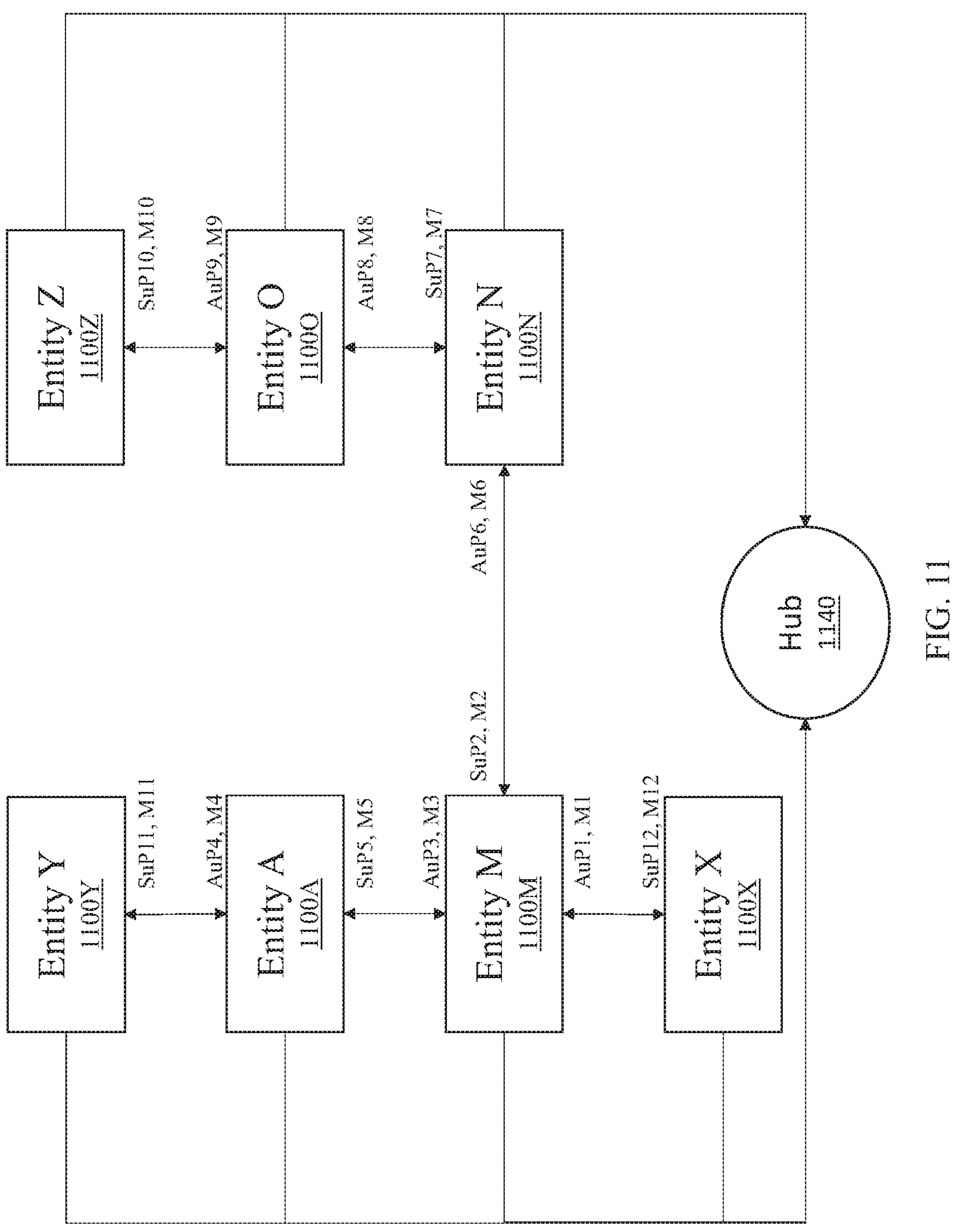
FIG. 11 illustrates an example configuration of network entities in a hub-and-spoke configuration, according to one or more embodiments.

For example, referring to FIG. 11, which illustrates an example configuration of network entities in a hub-and-spoke configuration, according to one or more embodiments. The example configuration of network entities in a hub-and-spoke configuration shown in FIG. 11 is similar to the example configuration of network entities in a peer-to-peer configuration shown in FIG. 5, with an addition of the hub 1140 that is communicatively coupled to each of Network Entity Y 1100Y, Network Entity A 1100A, Network Entity M 1100M, Network Entity X 1100X, Network Entity Z 1100Z, Network Entity O 1100O, and Network Entity N 1100N.

As shown in FIG. 11, for example, the hub 1140 may be configured to receive the authentication list of Network Entity A 1100A (e.g., the authentication list 600A of Network Entity A shown in FIG. 6) from an agent deployed in Network Entity A 1100A. The method then proceeds to operation S1020.

At operation S1020, the at least one processor may be configured to advertise the first authentication list to a second agent deployed in a second network entity. According to embodiments, the at least one processor may be configured to advertise the first authentication list to the second agent in accordance with a subscription model, including a Push and Pull Model and a Subscription Notify Model. According to embodiments, the first network entity and the second network entity may be authenticated with each other.

For example, returning to FIG. 11 and FIG. 6, the hub 1140 may be configured to advertise the authentication list 600A for Network Entity A shown in FIG. 6 to an agent deployed in Network Entity M 1100M (which is authenticated with Network Entity A 1100A).

According to embodiments, the advertising of the first authentication list may be done via an advertising interface. According to embodiments, the first agent and the second agent may be mutually authenticated with the hub. According to embodiments, the advertising interface may include an interface such as a REST API.

Examples of operations for advertising an authentication list in accordance with a Push and Pull Model in a hub-and-spoke configuration are described below with reference to FIG. 12, and examples of operations for advertising an authentication list in accordance with a Subscription Notify Model in a hub-and-spoke configuration are described below with reference to FIG. 13.

Upon performing operation S1020, the method 1000 may be ended or be terminated. Alternatively, method 1000 may return to operation S1020, such that the at least one processor may be configured to repeatedly perform, for at least a predetermined amount of time, the advertising the first authentication list (at operation S1020). For instance, the at least one processor may update the first authentication list in response to a change in the network, and then restart the advertising the first authentication list (at operation S1020).

To this end, the system of the present disclosure may advertise authenticated network entities in the network.

Example Operations for Advertising an Authentication List in Accordance With a Push and Pull Model in a Hub-and-Spoke Configuration in the Present Disclosure In the following several example operations performable by the at least one processor for advertising an authentication list are described with reference to FIG. 12.

Figure 12:
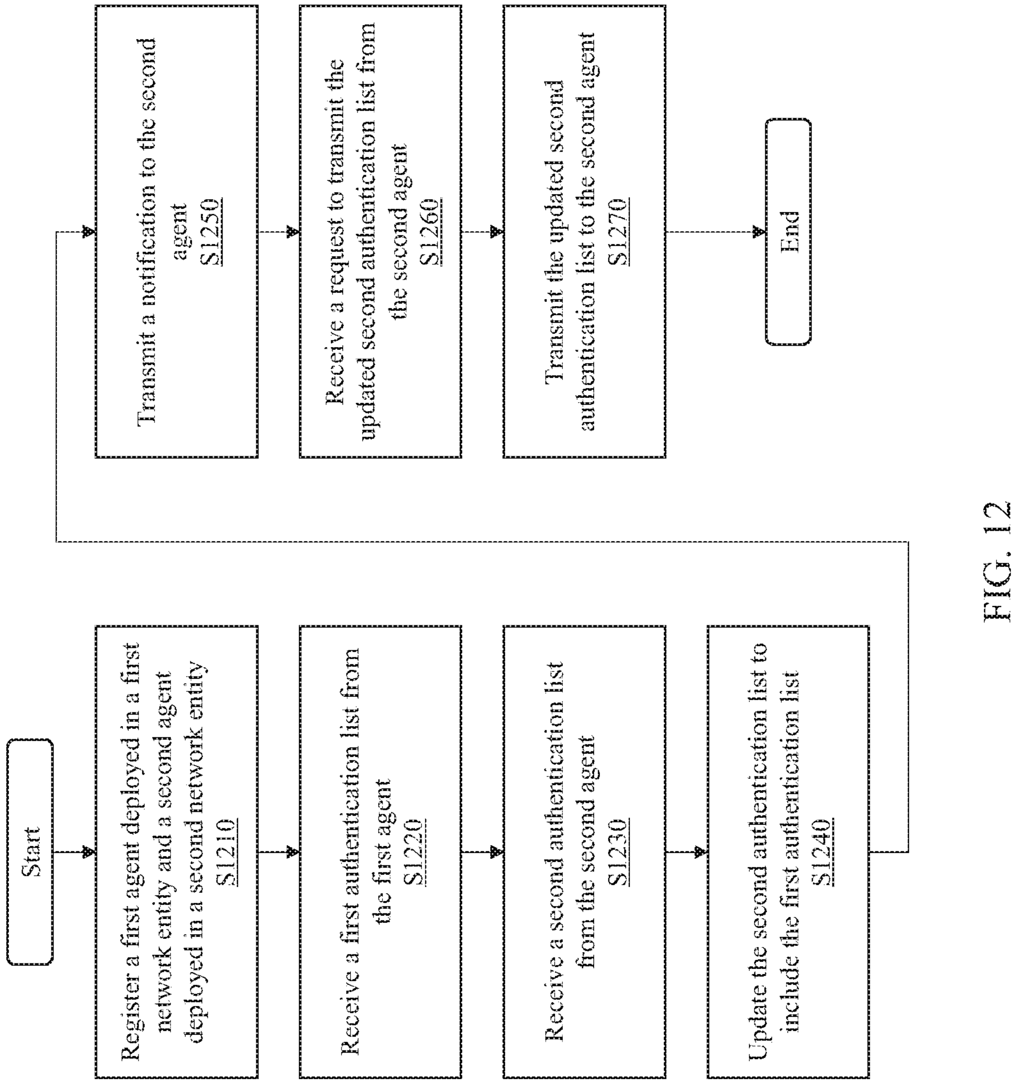
FIG. 12 illustrates a flow diagram of an example method for advertising an authentication list in accordance with a Push and Pull Model in a hub-and-spoke configuration, according to one or more embodiments.

FIG. 12 illustrates a flow diagram of an example method 1200 for advertising an authentication list in accordance with a Push and Pull Model in a hub-and-spoke configuration, according to one or more embodiments. One or more operations of method 1200 may be part of operation S1010 and S1020 in method 1000, and may be performed by at least one processor (e.g., processor 320) of the NEA system, which may corresponds to the hub communicatively coupled to the plurality of network entities in the system.

As illustrated in FIG. 12, at operation S1210, the at least one processor may be configured to register a first agent deployed in a first network entity and a second agent deployed in a second network entity. According to embodiments, the at least one processor may be configured to register the first agent and the second agent under the Push and Pull Model.

For example, the first agent and the second agent may be configured to register to an API function for the Push and Pull Model during bootstrapping, where an account and API keys will be confirmed by the API function and will be used for all API requests. The first agent and the second agent may then initiate a REST API POST request to subscribe to the Push and Pull Model, as well as provide information such as the API key, the channel name for subscription, and any additional parameters needed for the function. The method then proceeds to operation S1220.

At operation S1220, the at least one processor may be configured to receive a first authentication list from the first agent, in the similar manner as described above in relation to operation S1010. The method may then proceed to operation S1230.

At operation S1230, the at least one processor may be configured to receive a second authentication list from the second agent. According to embodiments, the first network entity and the second network entity may be authenticated with each other. It may be understood that the second authentication list may be created by the second agent in the similar manner as described above for the first agent in the peer-to-peer configuration.

For example, returning to FIG. 11, the hub 1140 may be configured to receive the authentication list of Network Entity M 1100M (e.g., the authentication list 600M of Network Entity M 1100M shown in FIG. 6) from an agent deployed in Network Entity M. The method then proceeds to operation S1240.

At operation S1240, the at least one processor may be configured to update the second authentication list to include the first authentication list. For example, the hub 1140 may be configured to update the authentication list of Network Entity M 1100M to include the authentication list of Network Entity A 1100A, in the similar manner as described above in operation S825 in method 805. The method then proceeds to operation S1250.

At operation S1250, the at least one processor may be configured to transmit a notification to the second agent. According to embodiments, the notification may notify the second agent regarding a change in the network. For example, the notification may specify that the first network entity is newly deployed in the network, that the first authentication list is received, that the second authentication list has been updated, etc.

According to embodiments, the event tracker of the hub may be configured to monitor the data stored in the hub, track the data received from and transmitted to the agents, and detect a change in the stored data (e.g., detect that the first authentication list is received from the first agent, that an updated first authentication list is received from the first agent, that the second authentication list has been updated, etc). Subsequently, the event tracker may inform the data store of the hub regarding the change, and utilize the notification mechanism of the hub to transmit the notification to the agents. The method then proceeds to operation S1260.

At operation S1260, the at least one processor may be configured to receive a request to transmit the updated second authentication list from the second agent. According to embodiments, the second agent may be configured to transmit the request in response to receiving the notification, and/or periodically. The method then proceeds to operation S1270.

At operation S1270, the at least one processor may be configured to transmit the updated second authentication list to the second agent in response to receiving the request. For example, with reference to FIG. 11, the hub 1140 may be configured to transmit the updated authentication list of Network Entity M 1100M (which includes the authentication list of Network Entity A 1100A) to the agent deployed in the Network Entity M 1100M, in the similar manner as described above in operation S835 in method 805.

According to embodiments, the at least one processor may be configured to store the received authentication lists, as well as the updated authentication lists, such that the hub may serve as a repository of information for all the authenticated supplicants in the open front haul network. In particular, the network topology mapper of the hub may use the stored authentication lists to form a consolidated data store of authenticated supplicants, and to create a topological map of all the authenticated supplicants in the open front haul network. Accordingly, the hub may be configured to develop a live network mapping application that can build a comprehensive topological overview of all the authenticated supplicants based on the stored authentication lists.

According to embodiments, the transmitting of the updated second authentication list may be done via an advertising interface. According to embodiments, the first agent and the second agent may be mutually authenticated with the hub. According to embodiments, the advertising interface may include an interface such as a REST API.

Upon performing operation S1270, the method 1200 may be ended or be terminated. Alternatively, method 1200 may return to operation S1220, such that the at least one processor may be configured to repeatedly perform, for at least a predetermined amount of time, the receiving the first authentication list (at operation S1220), the receiving the second authentication list (at operation S1230), the updating the second authentication list (at operation S1240), the transmitting the notification (at operation S1250), the receiving the request (at operation S1260), and the transmitting the updated second authentication list (at operation S1270).

For instance, the first network entity may newly authenticate with a network entity (change in the network), where the first authentication list is updated and transmitted to the hub in the similar manner as described above in relation to method 800. Accordingly, the at least one processor may receive the updated first authentication list, and then restart the receiving the first authentication list (at operation S1220), the receiving the second authentication list (at operation S1230), the updating the second authentication list (at operation S1240), the transmitting the notification (at operation S1250), the receiving the request (at operation S1260), and the transmitting the updated second authentication list (at operation S1270).

The above processes allow for the hub and agents to be readily informed of any changes to the network, and allows the agent to always have the most recent version of the authentication list.

To this end, the system of the present disclosure may advertise an authentication list in the network.

Example Operations for Advertising an Authentication List in Accordance With a Subscription Notify Model in a Hub-and-Spoke Configuration in the Present Disclosure In the following several example operations performable by the at least one processor for advertising an authentication list are described with reference to FIG. 13.

Figure 13:
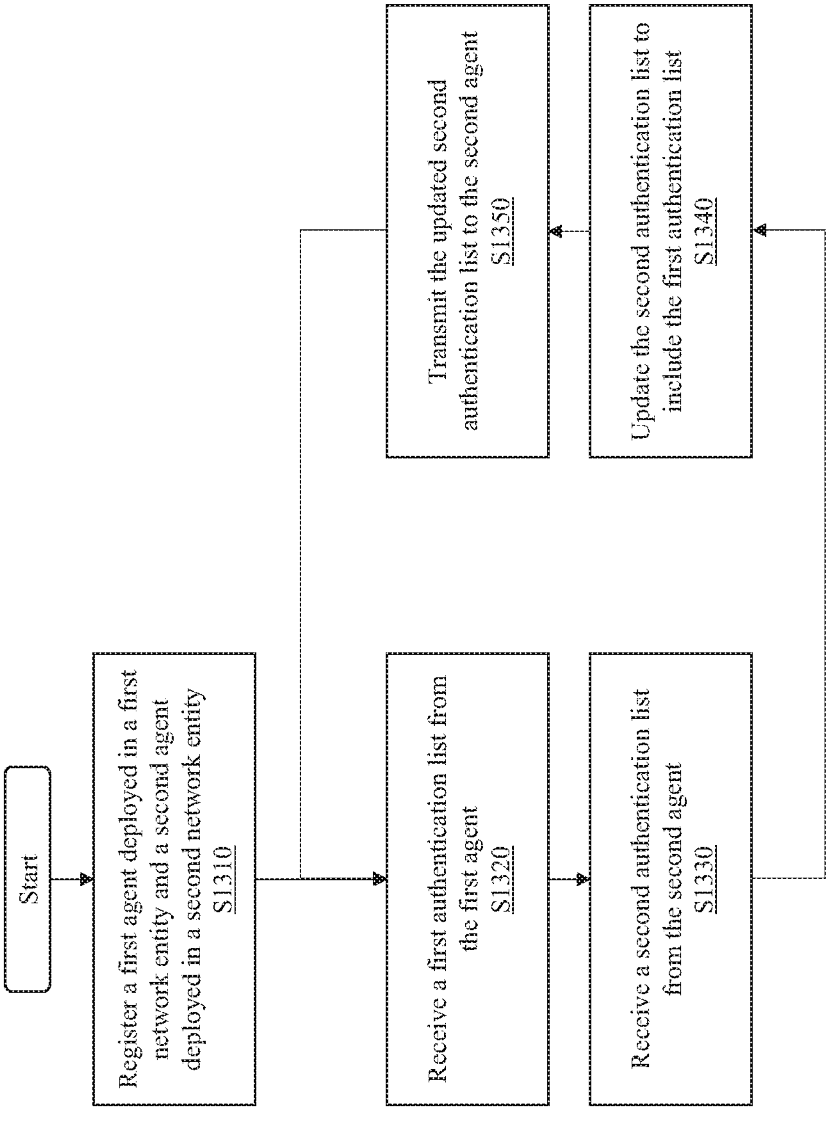
FIG. 13 illustrates a flow diagram of an example method for advertising an authentication list in accordance with a Subscription Notify Model in a hub-and-spoke configuration, according to one or more embodiments.

FIG. 13 illustrates a flow diagram of an example method 1300 for advertising an authentication list in accordance with a Subscription Notify Model in a hub-and-spoke configuration, according to one or more embodiments. One or more operations of method 1300 may be part of operation S1010 and S1020 in method 1000, and may be performed by at least one processor (e.g., processor 320) of the NEA system, which may corresponds to the hub communicatively coupled to the plurality of network entities in the system.

As illustrated in FIG. 13, at operation S1310, the at least one processor may be configured to register a first agent deployed in a first network entity and a second agent deployed in a second network entity. According to embodiments, the at least one processor may be configured to register the first agent and the second agent under the Subscription Notify Model.

In particular, the first and second agent may be configured to subscribe to a centralized endpoint URL of the hub using a REST API, where the Subscription Management Function API of the hub manages the process of the subscription, publishing, and notification. Subsequently, the hub respond to the first and second agent with a success status code to indicate that the subscription was successful, and keeps the connection between the hub and the first and second agents open. The method then proceeds to operation S1320.

At operation S1320, the at least one processor may be configured to receive a first authentication list from the first agent, in the similar manner as described above in relation to operation S1010. According to embodiments, the first agent may be configured to transmit the first authentication list periodically. The method may then proceed to operation S1330.

At operation S1330, the at least one processor may be configured to receive a second authentication list from the second agent. According to embodiments, the second agent may be configured to transmit the second authentication list periodically. According to embodiments, the first network entity and the second network entity may be authenticated with each other.

For example, returning to FIG. 11, the hub may be configured to receive the authentication list of Network Entity M (e.g., the authentication list of Network Entity M shown in FIG. 6) from an agent deployed in Network Entity M. The method then proceeds to operation S1234. The method may then proceed to operation S1340.

At operation S1340, the at least one processor may be configured to update the second authentication list to include the first authentication list. For example, the hub may be configured to update the authentication list of Network Entity M to include the authentication list of Network Entity A, in the similar manner as described above in operation S825 in method 805. The method then proceeds to operation S1350.

At operation S1350, the at least one processor may be configured to transmit the updated second authentication list to the second agent. According to embodiments, the at least one processor may be configured to transmit the updated second authentication list periodically. For example, the hub may be configured to transmit the updated authentication list of Network Entity M (which includes the authentication list of Network Entity A) to the agent deployed in the Network Entity M, in the similar manner as described above in operation S835 in method 805.

Upon performing operation S1350, the method 1300 may be return to operation S1320, such that the at least one processor may be configured to repeatedly perform, for at least a predetermined amount of time, the receiving the first authentication list (at operation S1320), the receiving the second authentication list (at operation S1330), the updating the second authentication list (at operation S1340), and the transmitting the updated second authentication list (at operation S1350).

For instance, the first network entity and the second network entity may periodically transmit the first authentication list and the second authentication list. Accordingly, the at least one processor may periodically receive the first authentication list and the second authentication list, and then restart the receiving the first authentication list (at operation S1320), the receiving the second authentication list (at operation S1330), the updating the second authentication list (at operation S1340), and the transmitting the updated second authentication list (at operation S1350) periodically.

Additionally, the first network entity may newly authenticate with a network entity (change in the network), where the first authentication list is updated and transmitted to the hub in the similar manner as described above in relation to method 800, during the above periodic transmission.

The above process allows for the hub and agents to be readily informed of any changes to the network, and allows the agent to always have the most recent version of the authentication list. The above process also guarantees that the hub is promptly informed whenever new data becomes available for transmission, as well as accommodate for errors and retries for any failure scenarios based on the "id" field to uniquely identify each message.

According to embodiments, the at least one processor may be configured to additionally transmit a notification to the second agent, receive a request from the second agent, and transmit the updated second authentication list to the second agent, in the similar manner as described above at operations S1250 to S1270 in method 1200.

To this end, the system of the present disclosure may advertise an authentication list in the network.

Figure 14A:
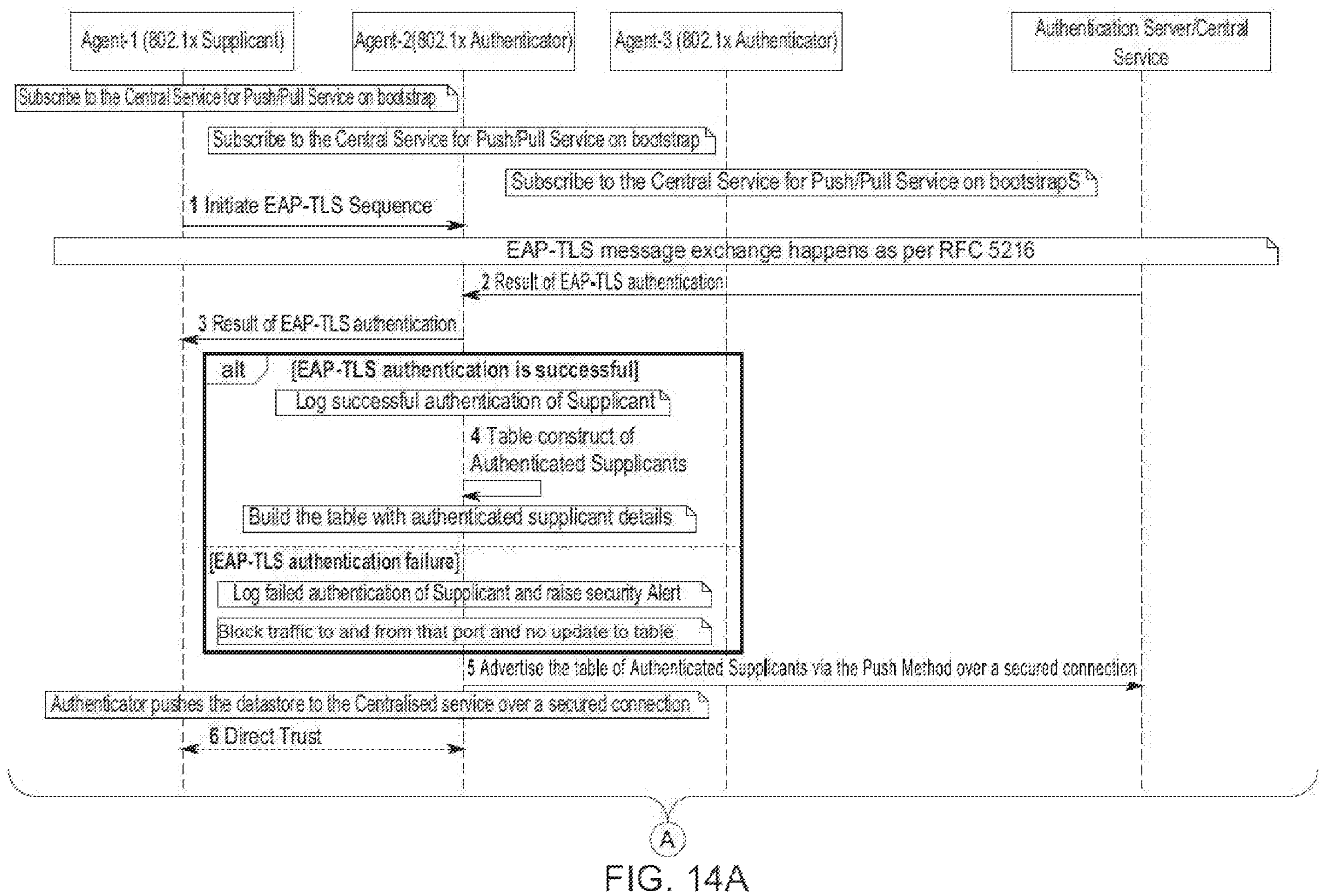
FIGS. 14A to 14C illustrate an example flow sequence for advertising authenticated network entities in accordance with the Push and Pull Model in a hub-and-spoke configuration, according to one or more embodiments.
Figure 14B:
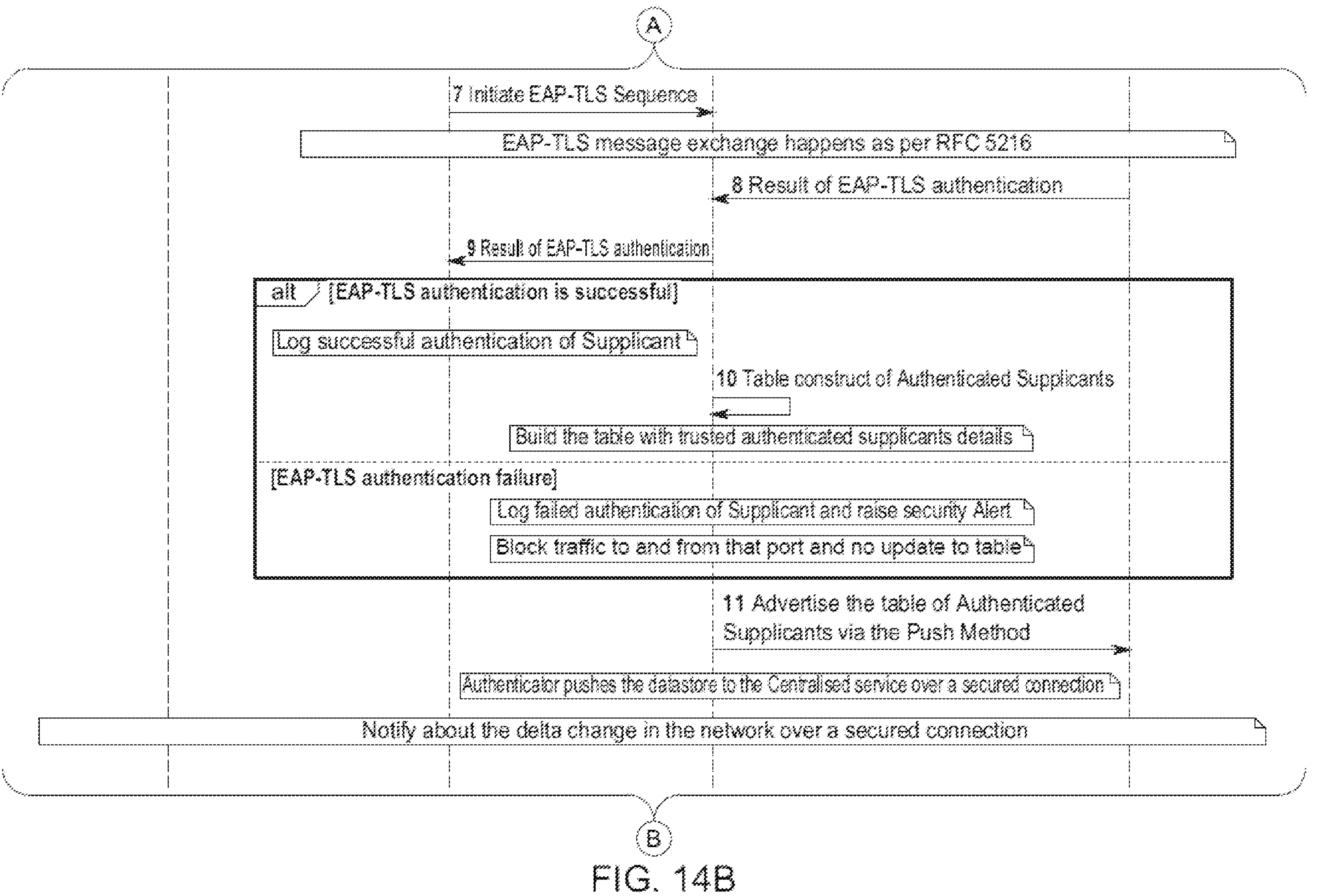
Figure 14C:
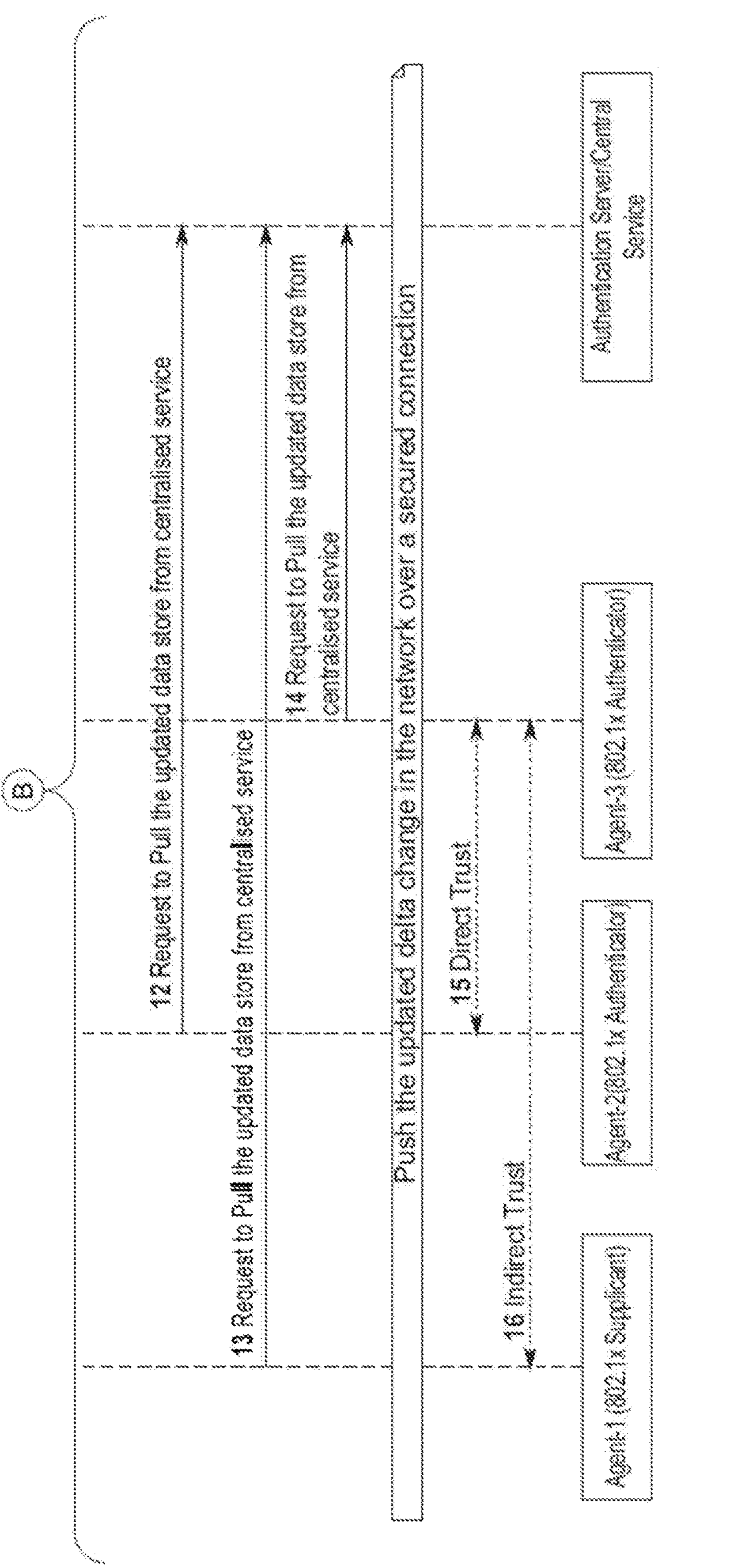

Example Sequence for Advertising Authenticated Network Entities in a Hub-and-Spoke Configuration in the Present Disclosure FIGS. 14A to 14C illustrate an example flow sequence for advertising authenticated network entities in accordance with the Push and Pull Model in a hub-and-spoke configuration, according to one or more embodiments. The example flow sequence shown in FIGS. 14A to 14C involve processes explained above in relation to method 1000 and 1200.

As shown in FIGS. 14A to 14C, the network includes 3 network entities deploying 3 agents (Agent 1, Agent 2, and Agent 3), and a central service (hub) located at an Authentication Server.

Prior to step 1, network entity 1, network entity 2, and network entity 3 subscribe (register) with the hub under the Push and Pull Model.

During steps 1-3, network entity 1 performs authentication with network entity 2 in accordance with RFC 5216 EAP-TLS Authentication Protocol of IEEE 802.1x. If the authentication is successful, the sequence proceeds to step 4. On the other hand, if the authentication is not successful, network entity 2 may raise a security alert, and block data traffic to and from network entity 1.

During steps 4 to 5, network entity 2 creates its authentication list, and advertises its authentication list to the hub over a secured connection.

During step 6, network entity 2 forms a direct trust with network entity 1. For example, once the authentication list of network entity 2 is received by the hub, the hub may be configured to create a trust list that specify that a trust level between network entity 2 and network entity 1 is a direct trust based on the authentication list of network entity 2 that specify network entity 1.

During steps 7 to 11, network entity 3 performs authentication with network entity 2, creates its authentication list, and advertises its authentication list to the hub, in the similar manner as for network entity 1 and network entity 2 described in steps 1 to 5.

After step 11, the hub transmits a notification to network entity 1, network entity 2, and network entity 3 regarding a change in the network.

During steps 12 to 14, network entity 1, network entity 2, and network entity 3 transmit requests to transmit an updated authentication list to the hub, and the hub then transmits the updated authentication list to the corresponding network entities.

During step 15, network entity 2 forms a direct trust with network entity 3. For example, the hub may update the authentication list of network entity 3 to include network entity 2, and create a trust list that specify that a trust level between network entity 2 and network entity 3 is a direct trust based on the authentication list of network entity 3 that specify network entity 2.

During step 16, network entity 1 forms an indirect trust with network entity 3. For example, the hub may update the authentication list of network entity 3 to include the authentication list of network entity 2 (which specify network entity 1), and create a trust list that specify that a trust level between network entity 3 and network entity 1 is an indirect trust based on the authentication list of network entity 3 that specify network entity 1.

It can be understood that the configuration illustrated in FIG. 5, FIG. 6. FIGS. 9A to 9C, FIG. 11, and FIGS. 14A to 14C are simplified for descriptive purpose, and is not intended to limit the scope of the present disclosure in any way. For example, in practice, the number of network entities in the system can be any number, the number of ports in each of the plurality of network entities can be any number, each of the plurality of network entities may be authenticated with any other network entities, the sequence of steps may be in any different order and may include additional steps, etc. Similarly, the authentication list and the trust list can be in any other form and can include any additional information in accordance with use.

Example Implementation Environment

Figure 15:
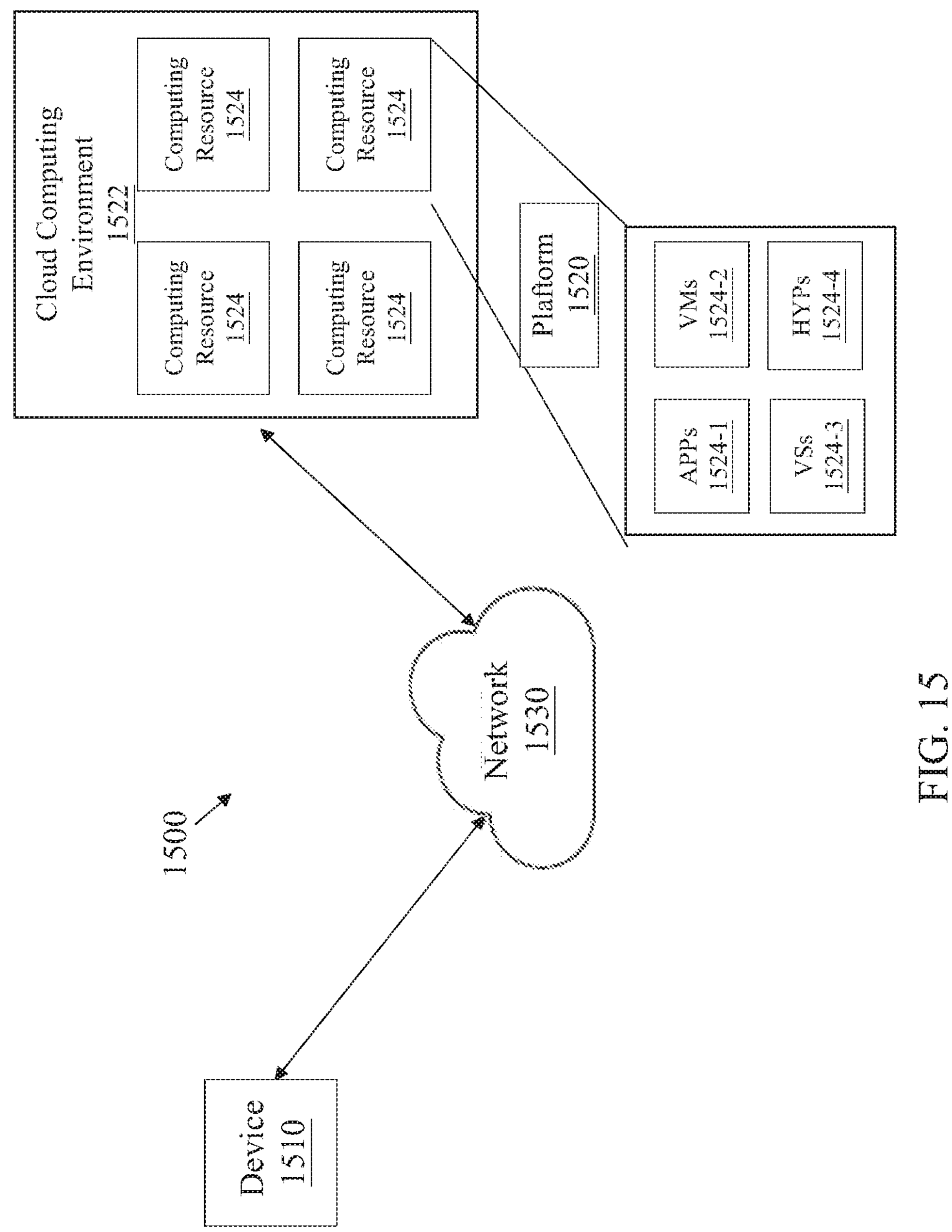
FIG. 15 illustrates a diagram of an example environment in which systems and/or methods, described herein, may be implemented.

FIG. 15 illustrates a diagram of an example environment 1500 in which systems and/or methods, described herein, may be implemented. As shown in FIG. 15, environment 1500 may include a device 1510, a platform 1520, and a network 1530. Devices of environment 1500 may interconnect via wired connections, wireless connections, or a combination of wired and wireless connections. In some embodiments, any of the functions and operations described with reference to FIG. 1 to FIG. 14 above may be performed by any combination of elements illustrated in FIG. 15.

According to embodiments, the NEA system described herein may be stored, hosted, or deployed in the cloud computing platform 1520. In this regard, device 1510 may include a device, system, equipment, or the like, utilized by the user (e.g., user of a marketing team, user of a network planning team, etc.) to access the NEA system. In that case, device 1510 may include one or more devices capable of receiving, generating, storing, processing, and/or providing information associated with platform 1520.

Platform 1520 includes one or more devices capable of receiving, generating, storing, processing, and/or providing information. In some implementations, platform 1520 may include a cloud server or a group of cloud servers. In some implementations, platform 1520 may be designed to be modular such that certain software components may be swapped in or out depending on a particular need. As such, platform 1520 may be easily and/or quickly reconfigured for different uses.

In some implementations, as shown, platform 1520 may be hosted in cloud computing environment 1522. Notably, while implementations described herein describe platform 1520 as being hosted in cloud computing environment 1522, in some implementations, platform 1520 may not be cloud-based (i.e., may be implemented outside of a cloud computing environment) or may be partially cloud-based.

Cloud computing environment 1522 includes an environment that hosts platform 1520. Cloud computing environment 1522 may provide computation, software, data access, storage, etc. services that do not require end-user (e.g., user device 1510) knowledge of a physical location and configuration of system(s) and/or device(s) that hosts platform 1520. As shown, cloud computing environment 1522 may include a group of computing resources 1524 (referred to collectively as "computing resources 1524" and individually as "computing resource 1524").

Computing resource 1524 includes one or more personal computers, a cluster of computing devices, workstation computers, server devices, or other types of computation and/or communication devices. In some implementations, computing resource 1524 may host platform 1520. The cloud resources may include compute instances executing in computing resource 1524, storage devices provided in computing resource 1524, data transfer devices provided by computing resource 1524, etc. In some implementations, computing resource 1524 may communicate with other computing resources 1524 via wired connections, wireless connections, or a combination of wired and wireless connections.

As further shown in FIG. 15, computing resource 1524 includes a group of cloud resources, such as one or more applications ("APPs") 1524-1, one or more virtual machines ("VMs") 1524-2, virtualized storage ("VSs") 1524-3, one or more hypervisors ("HYPs") 1524-4, or the like. While the current example embodiment is with reference to virtualized network functions, it is understood that one or more other embodiments are not limited thereto, and may be implemented in at least one of containers, cloud-native services, one or more container platforms, etc. For example, in one or more other example embodiments, any of the above-described components may be a software-based component deployed or hosted in, for example, a server cluster such as a hybrid cloud server, data center servers, and the like. The software-based component may be containerized and may be deployed and controlled by one or more machines, called "nodes", that run or execute the containerized network elements. In this regard, a server cluster may contain at least one master node and a plurality of worker nodes, wherein the master node(s) controls and manages a set of associated worker nodes.

Application 1524-1 includes one or more software applications that may be provided to or accessed by user device 1510. Application 1524-1 may eliminate a need to install and execute the software applications on user device 1510. For example, application 1524-1 may include software associated with platform 1520 and/or any other software capable of being provided via cloud computing environment 1522. In some implementations, one application 1524-1 may send/receive information to/from one or more other applications 1524-1, via virtual machine 1524-2.

Virtual machine 1524-2 includes a software implementation of a machine (e.g., a computer) that executes programs like a physical machine. Virtual machine 1524-2 may be either a system virtual machine or a process virtual machine, depending upon use and degree of correspondence to any real machine by virtual machine 1524-2. A system virtual machine may provide a complete system platform that supports execution of a complete operating system ("OS"). A process virtual machine may execute a single program, and may support a single process. In some implementations, virtual machine 1524-2 may execute on behalf of a user (e.g., user device 1510), and may manage infrastructure of cloud computing environment 1522, such as data management, synchronization, or long-duration data transfers.

Virtualized storage 1524-3 includes one or more storage systems and/or one or more devices that use virtualization techniques within the storage systems or devices of computing resource 1524. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1524-4 may provide hardware virtualization techniques that allow multiple operating systems (e.g., "guest operating systems") to execute concurrently on a host computer, such as computing resource 1524. Hypervisor 1524-4 may present a virtual operating platform to the guest operating systems, and may manage the execution of the guest operating systems. Multiple instances of a variety of operating systems may share virtualized hardware resources.

Network 1530 may include one or more wired and/or wireless networks. For example, network 1530 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 15 are provided as an example. In practice, there may be additional devices and/or networks, fewer devices and/or networks, different devices and/or networks, or differently arranged devices and/or networks than those shown in FIG. 15. Furthermore, two or more devices shown in FIG. 15 may be implemented within a single device, or a single device shown in FIG. 15 may be implemented as multiple, distributed devices. Additionally, or alternatively, a set of devices (e.g., one or more devices) of environment 1500 may perform one or more functions described as being performed by another set of devices of environment 1500.

Various Aspects of Embodiments

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: A system that may include: a memory storage storing computer-executable instructions; and at least one processor communicatively coupled to the memory storage, wherein the at least one processor may be configured to execute the instructions to: create a first authentication list for a first network entity, wherein the first authentication list specify one or more network entities that are authenticated with the first network entity; and advertise the first authentication list to a second agent deployed in a second network entity, wherein the second network entity is authenticated with the first network entity.

Item [2]: The system according to item [1], wherein the at least one processor may be configured to execute the instructions to advertise the first authentication list by transmitting the first authentication list to the second agent.

Item [3]: The system according to item [2], wherein the at least one processor may be configured to execute the instructions to update the first authentication list to include one or more authentication lists received from one or more agents deployed in one or more network entities that are authenticated with the first network entity; update the first authentication list to further specify one or more network entities that are newly authenticated with the first network entity; and transmit the updated first authentication list to the one or more agents deployed in the one or more network entities that are authenticated with the first network entity.

Item [4]: The system according to item [3], wherein: the system may include the first network entity that comprises a first agent; and the first agent may be configured to create the first authentication list, transmit the first authentication list, update the first authentication list, and transmit the updated first authentication list.

Item [5]: The system according to item [4], wherein the first agent and the second agent may be mutually authenticated with each other via at least one of digital certificate and an application programming interface (API) key.

Item [6]: A system that may include: a memory storage storing computer-executable instructions; and at least one processor communicatively coupled to the memory storage, wherein the at least one processor may be configured to execute the instructions to: receive a first authentication list from a first agent deployed in a first network entity, wherein the first authentication list specify one or more network entities that are authenticated with the first network entity; and advertise the first authentication list to a second agent deployed in a second network entity, wherein the second network entity is authenticated with the first network entity.

Item [7]: The system according to item [6], wherein: the at least one processor may be configured to execute the instructions to receive a second authentication list from the second agent; and the at least one processor may be configured to execute the instructions to advertise the first authentication list by: updating the second authentication list to include the first authentication list; and transmitting the updated second authentication list to the second agent.

Item [8]: The system according to item [7], wherein the at least one processor may be configured to execute the instructions to transmit a notification regarding the updated second authentication list to the second agent; receive a request to transmit the updated second authentication list from the second agent; and transmit the updated second authentication list in response to receiving the request.

Item [9]: The system according to any one of items [7]-[8], wherein: the first agent may be configured to transmit the first authentication list periodically; and the at least one processor may be configured to execute the instructions to transmit the updated second authentication list to the second agent periodically.

Item [10]: The system according to any one of items [6]-[9], wherein: the system may include a hub communicatively coupled to the first agent and the second agent; and the first agent and the second agent may be mutually authenticated with the hub via a mutual TLS (mTLS).

Item [11]: A method that may include: creating a first authentication list for a first network entity, wherein the first authentication list specify one or more network entities that are authenticated with the first network entity; and advertising the first authentication list to a second agent deployed in a second network entity, wherein the second network entity is authenticated with the first network entity.

Item [12]: The method according to item [11], wherein the advertising the first authentication list may include transmitting the first authentication list to the second agent.

Item [13]: The method according to item [12], may further include: updating the first authentication list to include one or more authentication lists received from one or more agents deployed in one or more network entities that are authenticated with the first network entity; updating the first authentication list to further specify one or more network entities that are newly authenticated with the first network entity; and transmitting the updated first authentication list to the one or more agents deployed in the one or more network entities that are authenticated with the first network entity.

Item [14]: The method according to item [13], wherein: the first network entity may include a first agent; and the first agent may be configured to create the first authentication list, transmit the first authentication list, update the first authentication list, and transmit the updated first authentication list.

Item [15]: The method according to item [14], wherein the first agent and the second agent may be mutually authenticated with each other via at least one of digital certificate and an application programming interface (API) key.

Item [16]: A method that may include: receiving a first authentication list from a first agent deployed in a first network entity, wherein the first authentication list specify one or more network entities that are authenticated with the first network entity; and advertising the first authentication list to a second agent deployed in a second network entity, wherein the second network entity is authenticated with the first network entity.

Item [17]: The method according to item [16], may further include: receiving a second authentication list from the second agent; wherein the advertising the first authentication list may include: updating the second authentication list to include the first authentication list; and transmitting the updated second authentication list to the second agent.

Item [18]: The method according to item [17], may further include: transmitting a notification regarding the updated second authentication list to the second agent; transmitting a notification regarding the updated second authentication list to the second agent; and transmitting the updated second authentication list in response to receiving the request.

Item [19]: The method according to any one of items [17]-[18], wherein: the first agent may be configured to transmit the first authentication list periodically; and the updated second authentication list may be transmitted to the second agent periodically.

Item [20]: The method according to any one of items [16]-[19], wherein: the receiving the first authentication list and the advertising the first authentication list may be performed by a hub communicatively coupled to the first agent and the second agent; and the first agent and the second agent may be mutually authenticated with the hub via a mutual TLS (mTLS).

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:

at least one memory storage storing computer-executable instructions; and at least one processor communicatively coupled to the at least one memory storage, wherein the at least one processor is configured to execute the instructions to:

create, by a first network entity, a first authentication list for the first network entity, wherein the first authentication list specifies one or more network entities that are authenticated, via an authentication server distinct from the first network entity and the one or more network entities, with the first network entity; and advertise the first authentication list to a second agent deployed in a second network entity, wherein the second network entity is authenticated with the first network entity.

2. The system according to claim 1, wherein the at least one processor is configured to execute the instructions to advertise the first authentication list by transmitting the first authentication list to the second agent.

3. The system according to claim 2, wherein the at least one processor is configured to execute the instructions to:

update the first authentication list to include one or more authentication lists received from one or more agents deployed in one or more network entities that are authenticated with the first network entity;

update the first authentication list to further specify one or more network entities that are newly authenticated with the first network entity; and transmit the updated first authentication list to the one or more agents deployed in the one or more network entities that are authenticated with the first network entity.

4. The system according to claim 3, wherein:

the system comprises the first network entity that comprises a first agent; and the first agent is configured to create the first authentication list, transmit the first authentication list, update the first authentication list, and transmit the updated first authentication list.

5. The system according to claim 4, wherein the first agent and the second agent are mutually authenticated with each other via at least one of digital certificate and an application programming interface (API) key.

6. A system comprising:

at least one memory storage storing computer-executable instructions; and at least one processor communicatively coupled to the at least one memory storage, wherein the at least one processor is configured to execute the instructions to:

receive a first authentication list from a first agent deployed in a first network entity, wherein the first authentication list specifies one or more network entities that are authenticated, via an authentication server distinct from the first network entity and the one or more network entities, with the first network entity; and advertise the first authentication list to a second agent deployed in a second network entity, wherein the second network entity is authenticated with the first network entity.

7. The system according to claim 6, wherein:

the at least one processor is configured to execute the instructions to receive a second authentication list from the second agent; and the at least one processor is configured to execute the instructions to advertise the first authentication list by:

updating the second authentication list to include the first authentication list; and transmitting the updated second authentication list to the second agent.

8. The system according to claim 7, wherein the at least one processor is configured to execute the instructions to:

transmit a notification regarding the updated second authentication list to the second agent;

receive a request to transmit the updated second authentication list from the second agent; and transmit the updated second authentication list in response to receiving the request.

9. The system according to claim 7, wherein:

the first agent is configured to transmit the first authentication list periodically; and the at least one processor is configured to execute the instructions to transmit the updated second authentication list to the second agent periodically.

10. The system according to claim 6, wherein:

the system comprises a hub communicatively coupled to the first agent and the second agent; and the first agent and the second agent are mutually authenticated with the hub via a mutual TLS (mTLS).

11. A method comprising:

creating, by a first network entity, a first authentication list for the first network entity, wherein the first authentication list specifies one or more network entities that are authenticated, via an authentication server distinct from the first network entity and the one or more network entities, with the first network entity; and advertising, by the first network entity, the first authentication list to a second agent deployed in a second network entity, wherein the second network entity is authenticated with the first network entity.

12. The method according to claim 11, wherein the advertising the first authentication list comprises transmitting the first authentication list to the second agent.

13. The method according to claim 12, further comprising:

updating the first authentication list to include one or more authentication lists received from one or more agents deployed in one or more network entities that are authenticated with the first network entity;

updating the first authentication list to further specify one or more network entities that are newly authenticated with the first network entity; and transmitting the updated first authentication list to the one or more agents deployed in the one or more network entities that are authenticated with the first network entity.

14. The method according to claim 13, wherein:

the first network entity comprises a first agent; and the first agent is configured to create the first authentication list, transmit the first authentication list, update the first authentication list, and transmit the updated first authentication list.

15. The method according to claim 14, wherein the first agent and the second agent are mutually authenticated with each other via at least one of digital certificate and an application programming interface (API) key.

16. A method comprising:

receiving a first authentication list from a first agent deployed in a first network entity, wherein the first authentication list specifies one or more network entities that are authenticated, via an authentication server distinct from the first network entity and the one or more network entities, with the first network entity; and advertising the first authentication list to a second agent deployed in a second network entity, wherein the second network entity is authenticated with the first network entity.

17. The method according to claim 16, further comprising:

receiving a second authentication list from the second agent;

wherein the advertising the first authentication list comprises:

updating the second authentication list to include the first authentication list; and transmitting the updated second authentication list to the second agent.

18. The method according to claim 17, further comprising:

transmitting a notification regarding the updated second authentication list to the second agent;

receiving a request to transmit the updated second authentication list from the second agent; and transmitting the updated second authentication list in response to receiving the request.

19. The method according to claim 17, wherein:

the first agent is configured to transmit the first authentication list periodically; and the updated second authentication list is transmitted to the second agent periodically.

20. The method according to claim 16, wherein:

the receiving the first authentication list and the advertising the first authentication list are performed by a hub communicatively coupled to the first agent and the second agent; and the first agent and the second agent are mutually authenticated with the hub via a mutual TLS (mTLS).

* * * * *